(12) United States Patent
Kagata et al.

(10) Patent No.: US 8,574,356 B2
(45) Date of Patent: Nov. 5, 2013

(54) INK COMPOSITION AND RECORDING METHOD

(75) Inventors: Takayoshi Kagata, Shiojiri (JP); Kiyohiko Takemoto, Matsumoto (JP); Tsuyoshi Sano, Shiojiri (JP); Shiki Hirata, Shiojiri (JP); Naoki Koike, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 160 days.

(21) Appl. No.: 13/107,394

(22) Filed: May 13, 2011

(65) Prior Publication Data
US 2011/0281032 A1 Nov. 17, 2011

(30) Foreign Application Priority Data

May 14, 2010 (JP) .................................. 2010-111821
Dec. 10, 2010 (JP) .................................. 2010-275456

(51) Int. Cl.
C09D 11/02 (2006.01)
(52) U.S. Cl.
USPC ...................... 106/31.9; 106/31.65; 106/31.92
(58) Field of Classification Search
USPC .................................... 106/31.92, 31.65, 31.9
See application file for complete search history.

(56) References Cited

U.S. PATENT DOCUMENTS

| | | | |
|---|---|---|---|
| 4,880,465 A | 11/1989 | Loria et al. | |
| 6,120,590 A * | 9/2000 | Miyamoto et al. | 106/31.6 |
| 7,303,619 B2 | 12/2007 | Oyanagi | |
| 7,449,239 B2 * | 11/2008 | Seeger et al. | 428/404 |
| 7,763,108 B2 | 7/2010 | Oyanagi et al. | |
| 2004/0173121 A1* | 9/2004 | Fukuo et al. | 106/31.89 |
| 2008/0257211 A1* | 10/2008 | Oriakhi | 106/31.65 |
| 2010/0167023 A1* | 7/2010 | Oyanagi et al. | 428/195.1 |
| 2010/0183809 A1* | 7/2010 | Oyanagi et al. | 427/256 |

FOREIGN PATENT DOCUMENTS

| | | |
|---|---|---|
| EP | 776952 A2 * | 6/1997 |
| JP | 3562754 A | 9/2000 |
| JP | 2005-68250 A | 3/2003 |
| JP | 2005-68251 A | 3/2003 |
| JP | 2008174712 A | 7/2008 |

* cited by examiner

*Primary Examiner* — Anthony J Green
*Assistant Examiner* — Veronica F Faison
(74) *Attorney, Agent, or Firm* — Nutter McClennen & Fish LLP; John J. Penny, V.; Christopher A. Potts

(57) ABSTRACT

An ink composition includes an aluminum pigment, a white pigment, and a dispersion solvent, wherein the ink composition has a structure in which the aluminum pigment is dispersed in the dispersion solvent and the content of the white pigment is 0.01% to 10% based on the content of the aluminum pigment, or includes silver particles, a white pigment, and water, wherein the particle diameter d90 in the particle diameter accumulation curve of the silver particles is 50 nm to 1 μm, the ink composition has a structure in which the silver particles are dispersed in the water, and the content of the white pigment is 1% to 10% based on the content of the silver particles.

13 Claims, 5 Drawing Sheets

INK COMPOSITION AND RECORDING METHOD

Priority is claimed under 35 U.S.C. §119 to Japanese Application No. 2010-111821 filed on May 14, 2010, and Application No. 2011-275456 filed on Dec. 10, 2010, which is hereby incorporated by reference in its entirety.

BACKGROUND

1. Technical Field

The present invention relates to an ink composition and a recording method.

2. Related Art

Heretofore, in order to form a coating film having metallic gloss on a printed material, a method using a printing ink in which a gold powder or a silver powder formed, for example, from a brass or aluminum fine powder is contained as a pigment, a foil press printing method using a metal foil, a thermal transfer method using a metal foil, or the like has been used.

However, as for a coating film obtained by using a printing ink in which a gold powder or a silver powder is used, the average particle diameter of the metal powder used is large, which is in the range of 10 µm to 30 µm, and thus, matte metallic gloss can be obtained but it is difficult to obtain specular gloss. Meanwhile, in the foil stamping or the thermal transfer in which a metal foil is used, a method in which an adhesive is coated to a printing medium, a flat and smooth metal foil is pressed thereon, and a recording medium is brought into close contact with a metal foil and heated to thermally fusion-bond the metal foil to the recording medium is adopted. Therefore, relatively good gloss can be obtained, but the number of steps in the production increases, and pressure or heat is applied during the production steps. Accordingly, the recording medium has been limited to, for example, a recording medium that is resistant to heat and deformation.

Recently, a large number of applications of an ink jet in printing have been developed, and one of the applications thereof is a metallic printing. For example, a JP-A-2008-174712 suggests a dispersion and an ink composition, including plate-shaped aluminum particles.

However, the metallic gloss of metallic printing can be obtained by coating a recording medium with fine metal powders, and thus an action of the powders with light cannot be completely removed. That is, from the viewpoints that the pigment is a powder, the optical properties of the powder may remain even after printing in some cases, and a black or brown powder hue has been adhered to, for example, metallic gloss in some cases. Also, an aluminum pigment or a pigment of silver particles with which metallic gloss equivalent to or higher than the aluminum pigment can be expected is blended as a powder with ink, and as a result, there has also been a problem with the hue of the powder in some cases.

An advantage according to some embodiments of the invention is to provide an ink composition expressing metallic gloss with less coloration when being printed on a recording medium, and a recording method therewith.

SUMMARY

The invention is intended to solve some of the above-referenced problems, and can be realized as Embodiments or Applications below.

Application 1

An ink compositions according to an aspect of the invention includes an aluminum pigment and a white pigment, and the content of the white pigment is 0.01 times to 10 times the content of the aluminum pigment.

With the ink composition of the present Application, an image having good metallic gloss with less coloration can be printed on a recording medium.

Application 2

In Application 1, the content of the white pigment may be 0.05 times to 0.25 times the content of the aluminum pigment.

With the ink composition of the present Application, the dispersibility of the white pigment is good, and the content of the white pigment can be reduced. When the ink composition is used for printing, coloration of the metallic gloss can be further depressed.

Application 3

In Application 1, the aluminum pigment may be an aluminum particle dispersion, having a thickness of 5 nm to 30 nm and a plate-shaped particle having a 50% average circle-equivalent diameter of 0.5 µm to 3 µm.

With the ink composition of the present Application, the dispersibility of the aluminum pigment is good, and when adhered on a recording medium, better metallic gloss can be expressed, and also, the storage stability can be increased.

Application 4

In Application 1, the content of the aluminum pigment may be 1% by mass to 10% by mass.

With the ink composition of the present Application, the dispersibility of the aluminum pigment becomes better, and thus, the storage stability can be further increased.

Application 5

In Application 1, the average particle diameter of the white pigment may be 100 nm to 2 µm.

With the ink composition of the present Application, the dispersibility of the white pigment becomes better, and thus, the storage stability can be further increased.

Application 6

In Application 1, the ink composition may further include water, wherein the content of the water may be 50% by mass to 95% by mass.

With the ink composition of the present Application, the dispersibility of the aluminum pigment and the white pigment becomes better, and thus, the storage stability can be further increased.

Application 7

In Application 1, the aluminum pigment may be a water-resistant aluminum pigment, which has been subjected to a surface treatment with tetraethoxysilane.

With the ink composition of the present Application, the dispersibility in water of the aluminum pigment becomes better, and thus, the storage stability in water can be further increased.

Application 8

A value calculated by $(\alpha 2/\alpha 1) \times (\beta 2/\beta 1)$ may be more than 1; wherein $\alpha 1$ and $\beta 1$ represent L* values and degrees of gloss, respectively, of an image printed at a duty of 60% with a composition obtained by removing the white pigment from the ink composition of Application 1, and $\alpha 2$ and $\beta 2$ represent L* values and degrees of gloss, respectively, of an image printed at a duty of 60% with the ink composition of Application 1.

With the ink composition of the present Application, the dispersibility of the aluminum pigment is good, and when being adhered on a recording medium, better metallic gloss can be expressed and also, the storage stability can be increased.

Application 9

A printing apparatus can stably eject the ink composition of Application 1 onto a printing medium.

With the ink composition of the present Application, when being adhered on a recording medium, better metallic gloss can be expressed and also, the ejecting stability of the printing apparatus can be increased.

Application 10

An ink composition according to another aspect of the invention includes silver particles, a white pigment, and water, wherein the particle diameter d90 in the particle diameter accumulation curve of the silver particles is 50 nm to 1 μm, the ink composition has a structure in which the silver particles are dispersed in the water, and the content of the white pigment is 1% to 10% based on the content of the silver particles.

With the ink composition of the present Application, when being printed on a recording medium, an image having good metallic gloss with less coloration can be recorded.

Application 11

In Application 10, the particle diameter d10 in the particle diameter accumulation curve of the silver particles may be 2 nm to 20 nm, and the ink composition may have a structure in which the silver particles are dispersed in the water as a dispersion colloid.

With the ink composition of the present Application, the dispersibility of the silver particles is good, and when being adhered on a recording medium, better metallic gloss can be expressed, and also, the storage stability can be increased.

Application 12

In Application 10, the particle diameter d50 in the particle diameter accumulation curve of the white pigment may be 100 nm to 2 μm.

With the ink composition of the present Application, the dispersibility of the white pigment is good, the content of the white pigment can be reduced, and also, when being adhered on a recording medium, coloration of metallic gloss can be further inhibited.

Application 13

In Application 10, the content of the water may be 50% by mass to 95% by mass.

With the ink composition of the present Application, the dispersibility of the silver particles and the white pigment becomes better, and the storage stability can be further increased.

Application 14

A recording method according to a still another aspect of the invention includes ejecting the ink composition of Application 10 and adhering the ejected ink composition on a recording medium to record an image using an ink jet recording apparatus.

With the recording method of the present Application, an image having metallic gloss with less coloration can be recorded on a recording medium.

Application 15

In Application 14, the particle diameter d10 in the particle diameter accumulation curve of the silver particles may be 2 nm to 20 nm, and the ink composition may have a structure in which the silver particles are dispersed in the water as a dispersion colloid.

With the recording method of the present Application, the storage stability of ink composition can be increased.

Application 16

In Application 14, the particle diameter d50 in the particle diameter accumulation curve of the white pigment may be 100 nm to 2 μm.

With the recording method of the present Application, the content of the white pigment can be reduced, and thus, an image having metallic gloss with less coloration can be recorded on a recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
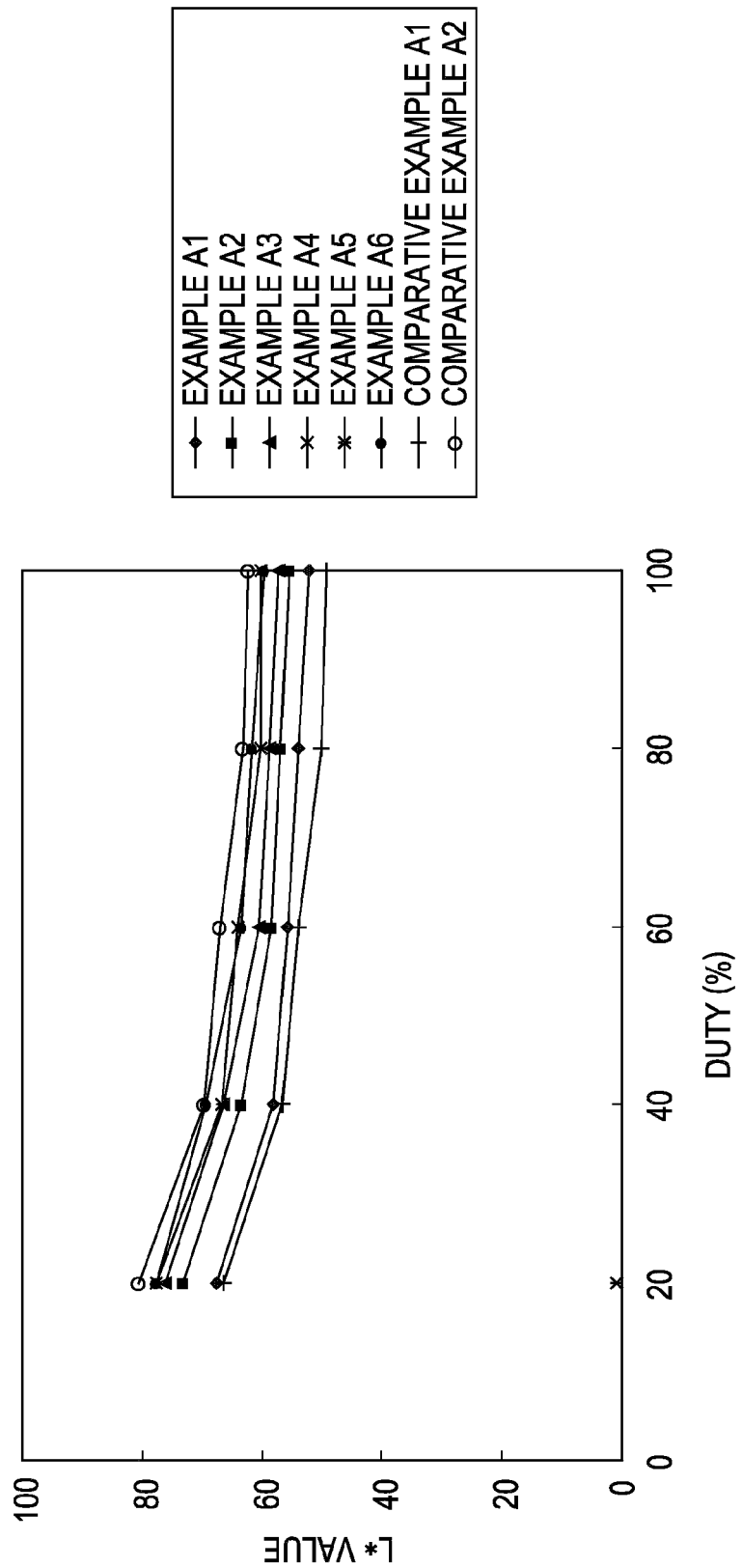
FIG. 1 shows a plot showing dependence of the whiteness on the duty of recorded matters of Examples and Comparative Examples.

Hereinbelow, the embodiments of the invention will be described. Furthermore, the following embodiments explain one example of the invention. By this, the invention is not limited on the following embodiments, and various modifications can be conducted within a range not modifying the gist. Further, it cannot be said that all of the constituents to be explained by the following embodiments are essential constitutional requirements of the invention.

Embodiment A

1. Ink Composition

The ink composition according to the present Embodiment A includes an aluminum pigment and a white pigment. Hereinbelow, each of the components will be described.

1.1. Aluminum Pigment Dispersion 1.1.1. Method for Preparation of Aluminum Pigment Dispersion The metal or the metal compound used in the metal or the metal compound layer of the composite pigment base material for preparing the metallic foil piece is not particularly limited as long as it has a function such as having metallic gloss, but aluminum, silver, gold, nickel, chromium, tin, zinc, indium, titanium, copper, and the like are used. At least one of these simple metals, metal compounds, and alloys or mixtures thereof is used.

The metal or metal compound layer is preferably formed by a vacuum deposition method, an ion plating method, or a sputtering method. The thickness of the metal or metal compound layer is not particularly limited, but is preferably in the range of 30 to 100 nm. When the thickness is less than 30 nm, the reflectivity or the brightness deteriorates, and thus, the performance as the metal pigment becomes poor, whereas when the thickness is more than 100 nm, the apparent specific gravity is increased, and thus, the dispersion stability of the metallic pigment is decreased. An unnecessary increase in the metal or metal compound layer only causes an increase in weight of the particles, and even when the film thickness is larger than this, the reflectivity and the brightness are not significantly changed.

The resin layer for peeling in the composite pigment base material for preparing the metallic pigment is an undercoat layer of the metal or metal compound layer, but is a peelable layer for enhancing peelability from the surface of the sheet-shaped substrate. The resin used in this resin layer for peeling is not particularly limited, but preferred are cellulose derivatives such as polyvinyl alcohol, polyalkylene glycol, polyacrylic acid, polyacryl amide, hydroxypropyl cellulose, carboxymethyl cellulose, cellulose acetate butyrate, and the like, polyvinyl acetal, polyvinyl butyral, acrylic acid copolymers, or modified nylon resins.

A solution of one or a mixture of two or more kinds of the resins is coated and subjected to drying and the like, thereby forming a layer. In the coating liquid, additives such as a viscosity modifier and the like can be contained.

The coating of the resin layer for peeling is performed by gravure coating, roll coating, blade coating, extrusion coating, dip coating, spin coating or the like which has been generally used. After the coating and drying, the surface is optionally smoothed by a calendaring treatment.

The thickness of the resin layer for peeling is not particularly limited, but is preferably from 0.5 to 50 µm, and more preferably from 1 to 10 µm. When the thickness is less than 0.5 µm, the amount as a dispersion resin is insufficient, whereas when the thickness is more than 50 µm, the resin layer is easily peeled at an interface with the pigment layer when rolled up.

The sheet-shaped substrate in the composite pigment base material for preparing the metallic pigment used in the invention is not particularly limited, and examples thereof include releasable films such as a polyester film of polytetrafluoroethylene, polyethylene, polypropylene, polyethylene terephthalate, polybutylene terephthalate, or the like, a polyamide film of nylon 66, nylon 6, or the like, a polycarbonate film, a triacetate film, or a polyimide film, and the like.

The sheet-shaped substrate is preferably polyethylene terephthalate or a copolymer thereof.

The thickness of the sheet-shaped substrate is not particularly limited, but is preferably from 10 to 150 µm. When the thickness is 10 µm or more, there is no problem with regard to handleability in the steps or the like, whereas when the thickness is 150 µm or less, the flexibility is sufficient, and thus, there is no problem with regard to rolling up, peeling, and the like.

Further, the metal or metal compound layer may be positioned between the protective layers. Examples of the protective layers include a silicon oxide layer and a protective resin layer.

The silicon oxide layer is not particularly limited as long as it is a layer containing silicon oxide, but is preferably formed of a silicon alkoxide such as tetraalkoxysilane and the like, or a polymer thereof, by a sol-gel method.

A method in which an alcohol solution in which the silicon alkoxide or a polymer thereof has been dissolved is coated and baked by heating, thereby forming a coating film of the silicon oxide layer, and the like can be mentioned.

The protective resin layer is not particularly limited as long as it is a resin insoluble in a dispersion medium, and examples thereof include for example polyester films formed of polyvinyl alcohol, polyethylene glycol, polyacrylic acid, polyacryl amide, a cellulose derivative, polytetrafluoroethylene, polyethylene, polypropylene, polyethylene terephthalate, polybutylene terephthalate, or the like, a polyamide film such as nylon 66, nylon 6, or the like, a polycarbonate film, a triacetate film, a polyimide film, and the like.

An aqueous solution of one or a mixture of two or more kinds of the resins is coated and subjected to drying and the like to form the layer. The coating liquid can contain additives such as a viscosity modifier and the like.

The coating of the silicon oxide and the resin is carried out in the same manner as that of the resin layer for peeling.

The thickness of the protective layer is not particularly limited, but is preferably in the range of 50 to 150 nm. When the thickness is less than 50 nm, the mechanical strength is insufficient, whereas when the thickness is more than 150 nm, the strength is excessively high, which causes difficulty of pulverizing/dispersion and peeling at an interface with the metal or metal compound layer in some cases. The metallic pigment can be obtained by peeling the metal or metal compound layer of the composite pigment base material from the sheet-shaped substrate at the resin layer for peeling as a boundary, and finely dividing it by pulverization.

The peeling treatment method is not particularly limited, but a method including immersing the composite pigment base material in a liquid, and a method including performing an ultrasonic treatment concurrently with immersion in a liquid, thereby performing a peeling treatment and a pulverization treatment of the peeled composite pigment are preferable.

In the metallic pigment thus obtained, the resin layer for peeling plays a role of a protective colloid, and it is possible to obtain a stable dispersion only by performing a dispersion treatment in a solvent. Further, in the ink composition using the metallic pigment, the resin derived from the resin layer for peeling also functions to impart adhesiveness to a recording medium such as paper and the like.

1.1.2. Method for Preparing Water-Resistant Aluminum Pigment Dispersion

The method for preparing the water-resistant aluminum pigment dispersion according to one embodiment of the invention is a method, including a first step of adding tetraethoxysilane to an aluminum pigment dispersion in which an aluminum pigment is dispersed in an organic solvent and allowing a silica film to form on the surface of the aluminum pigment by performing a reaction between a hydroxyl group present on the surface of the aluminum pigment and the tetraethoxysilane, a second step of removing at least a part of the organic solvent, and a third step of adding an aqueous solution including at least one selected from: a copolymer A including a structural unit represented by the following general formula (1) or the following formula (2) and a structural unit represented by the following general formula (3), a copolymer B including a structural unit represented by the following general formula (1) or the following formula (2) and a structural unit represented by the following general formula (4), and a copolymer C including a structural unit represented by the following general formula (1) or the following formula (2), a structural unit represented by the following general formula (4), and a structural unit represented by the general formula (5).

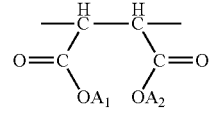

(1)

In the formula, $A_1$ and $A_2$ each independently represent hydrogen, an alkali metal, or ammonium.

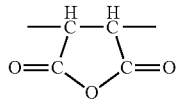
(2)

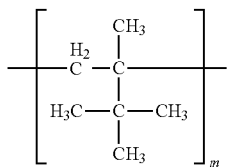
(3)

In the formula, m represents an integer from 1 to 5.

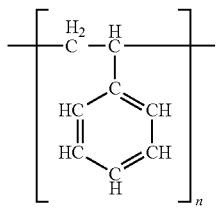
(4)

In the formula, n represents an integer from 1 to 5.

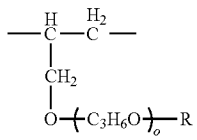
(5)

In the formula, o represents an integer from 1 to 5. R represents an alkyl groups.

Furthermore, the aluminum pigment which has been subjected to a water-resistant treatment will be described below, but it is not particularly limited, but it may be a so-called non-water-based (solvent-based) ink composition using an aluminum pigment, which has not been subjected to a treatment for water resistance.

The amount of addition of the aluminum pigment in the ink composition is not particularly limited, but is preferably from 1% by mass to 15% by mass, more preferably from 1% by mass to 10% by mass, and even more preferably from 1% by mass to 5% by mass.

Hereinafter, each of the steps as described above will be described in detail.

1.1.3. First Step

First, by the following steps (1) and (2), an aluminum pigment dispersion in which an aluminum pigment is dispersed in an organic solvent is prepared.

(1) A composite pigment base material is prepared, which has a structure in which a resin layer for peeling and an aluminum or an aluminum alloy layer (hereinafter simply referred to as "aluminum layer") are sequentially laminated on the surface of a sheet-shaped substrate.

The sheet-shaped substrate is not particularly limited, but examples thereof include releasable films such as a polyester film of polytetrafluoroethylene, polyethylene, polypropylene, polyethylene terephthalate or the like, a polyamide film of nylon 66, nylon 6, or the like, a polycarbonate film, a triacetate film, a polyimide film, and the like. Among those mentioned above, a film of a polyethylene terephthalate or a copolymer thereof is preferable.

The thickness of the sheet-shaped substrate is not particularly limited, but is preferably from 10 m to 150 μm. When the thickness is 10 μm or more, there is no problem with regard to handleability in the steps or the like, whereas when the thickness is 150 μm or less, the flexibility is sufficient, and thus, there is no problem with regard to rolling up, peeling, and the like.

The resin layer for peeling is an undercoat layer for the aluminum layer and is also peelable for improving the peeling property from the sheet-shaped substrate. As a resin used for this resin layer for peeling, for example, a polyvinyl alcohol, polyvinyl butyral, polyethylene glycol, polyacrylic acid, polyacryl amide, a cellulose derivative, an acrylic acid polymer, or a modified nylon resin is preferable.

A solution of one or a mixture of two or more of the resins as exemplified above can be coated on a sheet-shaped substrate and dried to form a resin layer for peeling. After coating, additives such as a viscosity modifier can also be included.

The coating of the resin layer for peeling is performed by a known technology, such as gravure coating, roll coating, blade coating, extrusion coating, dip coating, spin coating, and the like, which have been generally used. After the coating/drying, the surface can be optionally smoothed by a calendaring treatment.

The thickness of the resin layer for peeling is not particularly limited, but is preferably from 0.5 μm to 50 μm, and more preferably from 1 μm to 10 μm. When the thickness is less than 0.5 μm, the amount as a dispersion resin is insufficient, whereas when the thickness is more than 50 μm, the resin layer is easily peeled at an interface with the pigment layer when rolled up.

As a means for laminating the aluminum layer, a vacuum deposition method, an ion plating method, or a sputtering method is preferably applied.

In addition, as exemplified in JP-A-2005-68250, the aluminum layer may be positioned between the protective layers. As the protective layer, for example, a silicon oxide layer or a protective resin layer may be mentioned.

The silicon oxide layer is not particularly limited as long as it is a layer containing silicon oxide, but is preferably formed by a sol-gel method from a silicon alkoxide, such as a tetraalkoxysilane and the like, or a polymer thereof. When an alcohol solution dissolving a silicon alkoxide or a polymer thereof is coated and is then fired by heating, a coating film of a silicon oxide layer is formed.

For the protective resin layer, the resin is not particularly limited as long as it is not dissolved in a dispersion medium, but examples thereof include a polyvinyl alcohol, polyethylene glycol, polyacrylic acid, polyacryl amide, a cellulose derivative, and the like. Among these, a resin formed from a polyvinyl alcohol or a cellulose derivative is preferred.

When an aqueous solution containing one or a mixture of two or more of the resins exemplified above by way of example is coated and then dried, a protective resin layer can be formed. An additive such as a viscosity modifier and the like may be added to the coating liquid. The coating of the silicon oxide and the resin is performed by a method similar to that for the coating of the resin layer for peeling.

The thickness of the protective layer is not particularly limited but is preferably in the range of 50 nm to 150 nm.

When the thickness is less than 50 nm, the mechanical strength is not sufficient, whereas when the thickness is more than 150 nm, the strength is excessively increased, and thus, pulverization/dispersion becomes difficult and peeling may occur at the interface with the aluminum layer in some cases.

In addition, as exemplified in JP-A-2005-68251, a coloring material layer may be provided between the "protective layer" and the "aluminum layer".

The coloring material layer, which is provided to obtain an optional color composite pigment, is not particularly limited as long as it contains a coloring material which can impart optional color tone and color in addition to the metallic gloss, the brightness, and the background masking properties of the aluminum pigment used in the present embodiment. As the coloring material used for this coloring material layer, either a dye or a pigment may be used. In addition, as the dye or the pigment, a known material may be appropriately used.

In this case, the "pigment" used for the coloring material layer indicates a natural pigment, a synthetic organic pigment, a synthetic inorganic pigment, or the like, which is defined in general engineering fields.

A method for forming the coloring material layer is not particularly limited, but the coloring material layer is preferably formed by coating. In addition, when the coloring material used for the coloring material layer is a pigment, it preferably further contains a coloring material-dispersing resin. When the coloring material-dispersing resin is used, a resin thin film is preferably formed in such a way that after the pigment, the coloring material-dispersing resin, and whenever necessary, other additives or the like are dispersed or dissolved in a solvent to form a solution, a uniform liquid film is formed by spin coating of this solution, and drying is then performed. In addition, when the composite pigment base material is manufactured, the coloring material layer and the protective layer are preferably both formed by coating in view of working efficiency.

The composite pigment base material may also have a layer structure which includes a plurality of sequential lamination structures in each of which the resin layer for peeling and the aluminum layer are sequentially laminated. In this case, the total thickness of the lamination structures including a plurality of aluminum layers, that is, the thickness of the aluminum layer-resin layer for peeling-aluminum layer, which is obtained by removing the sheet-shaped substrate and the resin layer for peeling provided immediately thereon, or the thickness of the resin layer for peeling-aluminum layer is preferably 5000 nm or less. When the thickness is 5000 nm or less, even if the composite pigment base material is wound in the form of a roll, cracking and peeling are not likely to occur, and the storage stability is superior. In addition, when the composite pigment base material is formed into a pigment, it is preferable since the metallic glossiness is excellent. Although a structure in which the resin layers for peeling and the aluminum layers are sequentially laminated on two surface of the sheet-shaped substrate may also be mentioned by way of example, the structure is not limited to those described above.

(2) Next, when the sheet-shaped substrate of the composite pigment base material is peeled away therefrom at the interface between the surface of the sheet-shaped substrate of the composite pigment base material and the resin layer for peeling in an organic solvent, and the remaining portion is processed by carrying out a pulverization or a particularization treatment, an aluminum pigment dispersion containing large and coarse particles is obtained. Further, when the obtained aluminum pigment dispersion is filtered to remove large and coarse particles, an aluminum pigment dispersion containing plate-shaped aluminum particles can be obtained.

As the organic solvent, any solvent may be used as long as it does not impair the dispersion stability of the aluminum pigment and/or the reactivity with tetraethoxysilane as described below, but a polar organic solvent is preferable. Examples of the polar organic solvent include alcohols (methyl alcohol, ethyl alcohol, propyl alcohol, butyl alcohol, isopropyl alcohol, fluorinated alcohols, and the like), ketones (acetone, methyl ethyl ketone, cyclohexanone, and the like), carboxylic acid esters (methyl acetate, ethyl acetate, propyl acetate, butyl acetate, methyl propionate, ethyl propionate, and the like), ethers (diethyl ether, dipropyl ether, tetrahydrofuran, dioxane, and the like), etc.

Among the polar organic solvents exemplified above, an alkylene glycol monoether or an alkylene glycol diether which is a liquid at a normal temperature and a normal pressure is more preferable.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, and the like.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

Among these, from the viewpoints of the superior dispersibility stability of the aluminum pigment, triethylene glycol monobutyl ether or diethylene glycol diethyl ether is more preferable. In addition, from the viewpoints of imparting the aluminum pigment with the glossiness and the water resistance, diethylene glycol diethyl ether is particularly preferable.

The peeling treatment method performed on the sheet-shaped substrate is not particularly limited, but a method in which peeling is performed by immersing the composite pigment base material in a liquid or a method in which when the composite pigment base material is immersed in a liquid, an ultrasonic treatment is simultaneously performed to implement a peeling treatment and a pulverization treatment of the peeled composite pigment is preferable.

In the aluminum pigment including plate-shaped particles obtained as described above, the resin layer for peeling functions as a protective colloid, and a stable dispersion can be obtained only by performing a dispersing treatment in an organic solvent. In addition, when the aluminum pigment is used for an ink composition, a resin derived from the resin layer for peeling may also function to impart adhesiveness on a recording medium.

From the viewpoints of imparting good water resistance and metallic glossiness, the aluminum pigment in the aluminum pigment dispersion obtained by the steps described above preferably includes plate-shaped particles.

Here, when the long diameter, the short diameter, and the thickness on the planar area of an aluminum pigment are represented by X, Y, and Z, respectively, the "plate-shaped particle" indicates a particle having an approximately flat surface (X-Y planar area) and having an approximately constant thickness (Z). More specifically, a 50% average particle diameter R50 (hereinafter also referred to as "R50") of the circle-equivalent diameter, which is determined from the areas of the approximately flat surfaces (X-Y planar areas) of the aluminum pigment, is 0.5 μm to 3 μm and the thickness (Z) is 5 nm to 30 nm. Examples of the apparatuses for measuring the long diameter X, the short diameter Y, and the thickness Z include a transmission electron microscope (TEM, JEOL, JEM-2000 EX), and a field emission scanning electron microscope (FE-SEM, Hitachi, S-4700).

The "circle-equivalent diameter" is the diameter of a circle when an approximately flat surface (X-Y planar area) of the aluminum pigment is assumed as the circle having the same projection area as the projection area of an aluminum pigment. For example, when an approximately flat surface (X-Y planar area) of an aluminum pigment has a polygonal shape, a circle having the same projection area as that of the polygonal shape is assumed, and the diameter of this circle is referred to as the "circle-equivalent diameter of this aluminum pigment".

In order to ensure a superior metallic glossiness and printing stability, the 50% average particle diameter R50 of a corresponding circle diameter obtained by calculation from the areas of the approximately flat surfaces (X-Y planar areas) of the plate-shaped particles is preferably in the range of 0.5 to 3 μm and more preferably in the range of 0.75 to 2 μm. When R50 is less than 0.5 μm, the metallic gloss may not be sufficient in some cases. On the other hand, when R50 is more than 3 μm, the printing stability may be degraded in some cases.

The maximum particle circle-equivalent diameter obtained by calculation from the areas of approximately flat surfaces (X-Y planar areas) of the plate-shaped particles is preferably 10 μm or less. When the maximum particle diameter is set to 10 μm or less, nozzles of an ink jet recording apparatus, foreign-substance removing filters provided in ink flow paths, and the like are prevented from being clogged with the plate-shaped particles.

The long diameter X and the short diameter Y on the planar area of each of the plate-shaped particles can be measured by a particle image analyzer. Examples of the particle image analyzer include flow type particle image analyzers, FPIA-2100, FPIA-3000, and FPIA-3000S (all manufactured by Sysmex Corporation).

The particle size distribution (CV value) of the plate-shaped particles can be determined by the following formula (5).

$$CV\text{ value} = \text{standard deviation of particle size distribution/average value of particle diameters} \times 100 \quad (6).$$

Here, the CV value obtained is preferably 60 or less, more preferably 50 or less, and particularly preferably 40 or less. By selecting plate-shaped particles having a CV value of 60 or less, an effect of excellent printing stability can be obtained.

From the viewpoints of ensuring the metallic glossiness, the thickness (Z) is preferably from 5 nm to 30 nm and more preferably from 10 nm to 25 nm. When the thickness (Z) is less than 5 nm, when a silica film is formed on the surface of the aluminum pigment, the metallic glossiness tends to decrease. On the other hand, when the thickness (Z) is more than 30 nm, the metallic glossiness also tends to decrease.

From the viewpoints of the cost and of ensuring the metallic glossiness, the aluminum pigment is preferably composed of aluminum or an aluminum alloy. When an aluminum alloy is used, examples of another metal element or non-metal element to be added besides aluminum include silver, gold, platinum, nickel, chromium, tin, zinc, indium, titanium, copper, and the like.

Here, there may be provided a step of washing an aluminum pigment contained in the aluminum pigment dispersion. For washing of the aluminum pigment, the organic solvent as described above may be used.

The resin layer for peeling described above may be contained in the aluminum pigment dispersion, or the resin layer for peeling may be adhered to the aluminum pigment in some cases. A component contained in the resin layer for peeling may disturb a reaction between the aluminum pigment and tetraethoxysilane which will be described below. Hence, when the component of the resin layer for peeling is removed by washing the aluminum pigment, the reactivity between the aluminum pigment and tetraethoxysilane which will be described below can be improved.

A method for washing the aluminum pigment is not particularly limited, but the washing can be carried out as follows, for example.

First, at least a part of the organic solvent is removed from the above aluminum pigment dispersion. For the removal of the organic solvent, by an operation, such as filtration, centrifugal sedimentation, centrifugal separation, and the like, the organic solvent and the aluminum pigment are separated from each other, so that the organic solvent contained in the aluminum pigment dispersion is removed.

Next, an organic solvent for washing is added to the aluminum pigment so as to disperse the aluminum pigment in the organic solvent, and then, the organic solvent for washing is removed. In addition, the step of dispersing the aluminum pigment in the organic solvent for washing and the step of removing the organic solvent for washing may be carried out plural times.

Subsequently, by adding the organic solvent mentioned above to the aluminum pigment to disperse the aluminum pigment therein, an aluminum pigment dispersion containing a washed aluminum pigment can be obtained.

(3) Next, tetraethoxysilane (hereinafter also referred to as "TEOS") is added in the aluminum pigment dispersion and is then stirred. Accordingly, a hydrolysis reaction occurs between TEOS and a hydroxyl group present on the surface of the aluminum pigment, so that a silica film can be formed on the surface of the aluminum pigment. When the aluminum pigment is dispersed in water, hydrogen gas is generated, and as a result, the aluminum pigment is whitened due to the generation of alumina. Hence, water resistance is imparted by covering the surface of the aluminum pigment with a silica film, and the metallic gloss of the aluminum pigment is prevented from being lost due the whitening thereof.

The reaction temperature in the hydrolysis reaction is preferably from 10° C. to 150° C., and more preferably from 20° C. to 130° C. When the temperature is lower than 10° C., the hydrolysis reaction is slow and the formation of the silica film on the surface of the aluminum pigment is liable to be insufficient. When the temperature is higher than 150° C., particular attention must be paid from a safety point of view.

The reaction time in the hydrolysis reaction is preferably from 0.5 hours to 200 hours, and more preferably from 1 hour to 180 hours. When the reaction time is less than 0.5 hours, the hydrolysis reaction may not be sufficiently completed in some cases, and hence sufficient water resistance and water dispersibility may not be obtained. When the reaction time is more than 200 hours, the aluminum pigment may agglomerate in some cases.

The amount of addition of TEOS may be determined by calculation so that the thickness of the silica film is 0.5 nm to 10 nm, and preferably 5 nm. The reason for this is that when the thickness of the silica film is more than 10 nm, the metallic glossiness may be decreased in some cases.

In particular, with respect to 1 part by mass of the aluminum pigment, the amount of addition of TEOS is preferably from 0.2 parts by mass to 5 parts by mass, more preferably from 0.5 parts by mass to 4 parts by mass, and even more preferably from 1 part by mass to 3 parts by mass. When the amount of addition of TEOS is more than 5 parts by mass, the aluminum pigment dispersion may be white and clouded in some cases due to unreacted TEOS. On the other hand, when the amount of addition is less than 0.2 parts by mass, the hydroxyl group present on the surface of the aluminum pigment may not be completely covered in some cases.

In the first step, after TEOS is added, ammonia may also be added as a basic catalyst. Ammonia can facilitate the hydrolysis reaction of TEOS.

With respect to 10 parts by mass of the aluminum pigment, the amount of addition of ammonia is preferably 1 part by mass or less, and more preferably 0.1 parts by mass or less. When the amount of addition of ammonia is more than the range described above, the viscosity of the aluminum pigment dispersion increases, and the aluminum pigment in the aluminum pigment dispersion agglomerates, so that the metallic gloss cannot be maintained.

1.1.4. Second Step

In the second step of the present embodiment, at least a part of the organic solvent is removed from the aluminum pigment dispersion.

For removal of the organic solvent, the aluminum pigment provided with the silica film and the organic solvent are separated by operation, such as filtration, centrifugal sedimentation, or centrifugal separation, so that the organic solvent contained in the aluminum pigment dispersion is removed. Among the operations mentioned above, since the centrifugal separation is simple, the peeling is preferably performed thereby to remove the organic solvent. By one of the methods described above, the organic solvent contained in the aluminum pigment dispersion is preferably removed in an amount of 70% or more, and more preferably in an amount of 80% or more.

1.1.5. Third Step

In the third step according to the present embodiment, an aqueous solution including at least one selected from a copolymer A, a copolymer B, and a copolymer C (hereinafter also referred to as the "aqueous surfactant solution") is added. The copolymer A, the copolymer B, and the copolymer C may be used singly or in combination thereof.

In the third step according to the present embodiment, an aqueous surfactant solution obtained is added to the aluminum pigment dispersion and is then sufficiently stirred. In the present embodiment, the first step, the second step, and the third step are preferably performed in that order. The reason for this is that when the aqueous surfactant solution is added in the third step after the second step is performed, the agglomeration of the aluminum pigment can be effectively prevented, and the dispersibility of the water-resistant aluminum pigment dispersion can be improved.

By the present step, the organic solvent in the aluminum pigment dispersion obtained in the above step can be changed to a water-based solvent by solvent replacement, so that a water-resistant aluminum pigment dispersion having superior water dispersibility can be obtained. In addition, since the solvent of the water-resistant aluminum pigment dispersion obtained in the present step has a water-based solvent as a base, the water-resistant aluminum pigment dispersion can be easily applied to an aqueous ink composition.

The stirring time after the addition of the aqueous surfactant solution is not particularly limited, but is preferably from about 3 hours to 120 hours. When the stirring time is in the range described above, a water-resistant aluminum pigment dispersion having superior water dispersibility can be obtained without degrading the metallic glossiness. When the stirring time is more than 120 hours, the metallic glossiness may be degraded in some cases due to agglomeration of the aluminum pigment.

The copolymer A has a structural unit represented by the following formula (1) or the following formula (2) and a structural unit represented by the following formula (3). The copolymer B has a structural unit represented by the following formula (1) or the following formula (2) and a structural unit represented by the following formula (4). The copolymer C has a structural unit represented by the following formula (1) or the following formula (2), a structural unit represented by the following formula (4), and a structural unit represented by the following formula (5)

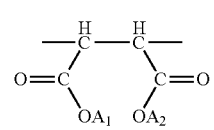

(1)

In the formula, $A_1$ and $A_2$ each independently represent hydrogen, an alkali metal, or ammonium.

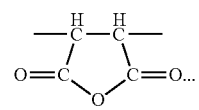

(2)

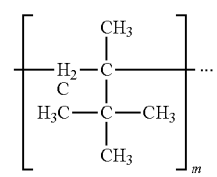

(3)

In the formula, m represents an integer from 1 to 5.

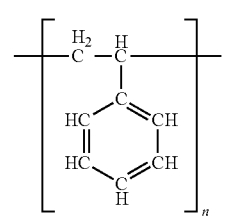

(4)

In the formula, n represents an integer from 1 to 5.

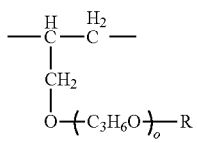

(5)

In the formula, o represents an integer from 1 to 5. R represents an alkyl group.

In the general formula (3) above, m is an integer from 1 to 5 and is preferably an integer from 1 to 3. In addition, n in the general formula (4) is an integer from 1 to 5, and preferably an integer from 1 to 3. In addition, o in the general formula (5) is an integer from 1 to 5, and preferably an integer from 1 to 3.

The copolymer A, the copolymer B, and the copolymer C may be any one of an alternate copolymer, a random copolymer, a block copolymer, a graft copolymer, and the like.

The copolymer A, the copolymer B, and the copolymer C have a bulky molecular structure. Hence, after being adsorbed on the surface of the aluminum pigment provided with the silica film, the copolymer A, the copolymer B, and the copolymer C can effectively suppress agglomeration between the aluminum pigments provided with the silica film by a steric hindrance function derived from the molecular structure.

The weight average molecular weight of the copolymer A, the copolymer B, and the copolymer C are preferably from 2000 to 500000, and more preferably from 10000 to 100000. When the weight average molecular weights of the copolymer A, the copolymer B, and the copolymer C are each more than the above range, the viscosity of the water-resistant aluminum pigment dispersion is increased, and the dispersibility thereof is degraded. On the other hand, when the weight average molecular weights of the copolymer A, the copolymer B, and the copolymer C are each less than the above range, the steric hindrance effect of the surfactant cannot be expected, and the dispersibility of the water-resistant aluminum pigment dispersion is degraded.

Furthermore, the weight average molecular weight is measured, for example, by gel permeation chromatography (GPC) using tetrahydrofuran as a solvent and can be obtained as a molecular weight in terms of polystyrene.

Examples of the copolymer A include Polystar OM (trade name, manufactured by NOF Corporation) which is a copolymer including maleic acid and Olefin (registered trademark) as structural units. Examples of the copolymer B include DSK Discoat (registered trademark) N-10 (trade name, manufactured by Dai-ichi Kogyo Seiyaku Co., Ltd.) which is a copolymer including maleic acid and styrene as structural units. Examples of the copolymer C include Malialim AKM-0531 (trade name, manufactured by NOF Corporation) which is a copolymer including maleic anhydride and polyoxypropylene alkyl ether as structural units.

With respect to 1 part by mass of the aluminum pigment, the sum of the amounts of addition of the copolymer A, the copolymer B, and the copolymer C is preferably from 0.02 parts by mass to 1.5 parts by mass, more preferably from 0.03 parts by mass to 1.3 parts by mass, and even more preferably from 0.03 parts by mass to 1.2 parts by mass. As the sum of the amounts of addition of the copolymer A, the copolymer B, and the copolymer C is more than the range described above, the dispersibility of the water-resistant aluminum pigment dispersion may be degraded in some cases. On the other hand, when the sum of the amounts of addition of the copolymer A, the copolymer B, and the copolymer C is less than the above range, the aluminum pigment agglomerates, and as a result, the metallic gloss cannot be maintained.

With respect to the total mass of the water-resistant aluminum pigment dispersion, the amount of addition of the aqueous surfactant solution is preferably 70% by mass or more, and more preferably 80% by mass or more.

2. Water-Resistant Aluminum Pigment Dispersion

The water-resistant aluminum pigment dispersion according to the present embodiment can be manufactured by the steps for preparation as described above. In the water-resistant aluminum pigment dispersion of the present embodiment, the water-resistant aluminum pigment in which the aluminum pigment is covered with the silica film is dispersed in an aqueous solution containing at least one selected from the group consisting of the copolymer A, the copolymer B, and the copolymer C.

According to the water-resistant aluminum pigment dispersion according to the present embodiment, since the silica film is formed on the surface of the aluminum pigment, the water resistance is imparted thereto, and even when being blended with an aqueous paint or an aqueous ink composition, the metallic glossiness is not degraded. In addition, since the aluminum pigment covered with the silica film is dispersed in an aqueous solution containing at least one selected from the group consisting of the copolymer A, the copolymer B, and the copolymer C, a water-resistant aluminum pigment dispersion having superior water dispersibility can be obtained without degrading the water resistance and the metallic glossiness.

The water-resistant aluminum pigment may be one which has been subjected to a surface treatment with tetraethoxysilane. As described above, when the surface of the aluminum pigment is treated with tetraethoxysilane, a water-resistant aluminum pigment having superior water resistance can be obtained.

The aluminum pigment is preferably a plate-shaped aluminum pigment having a thickness of 5 nm to 30 nm and a 50% average particle diameter (R50) from 0.5 μm to 3 μm.

As described above, when the thickness of the aluminum pigment is 5 nm to 30 nm, a water-resistant aluminum pigment having excellent metallic glossiness can be formed. On the other hand, when the thickness is less than 5 nm, the metallic glossiness tends to decrease, and when the thickness is more than 30 nm, the metallic glossiness also tends to decrease.

As described above, when the R50 of the aluminum pigment is 0.5 μm to 3 μm, a superior metallic glossiness and printing stability can be ensured. When the R50 is less than 0.5 μm, the metallic glossiness may become insufficient. On the other hand, when the R50 is more than 3 μm, the printing stability may be degraded in some cases.

The thickness of the silica film is preferably from 0.5 nm to 10 nm, and more preferably from 1 nm to 9 nm. When the thickness of the silica film is less than 0.5 nm, sufficient water resistance and water dispersibility cannot be imparted to the aluminum pigment. On the other hand, when the thickness of the silica film is more than 10 nm, the water resistance and the water dispersibility can be imparted to the aluminum pigment, but the metallic glossiness tends to decrease.

The surface condition of the water-resistant aluminum pigment dispersion according to the present embodiment can be identified by an element analysis using an X-ray photoelectron spectroscopic method (hereinafter referred to as "XPS"). The principle of XPS is roughly as follows.

XPS is a spectroscopic method in which the energy of photoelectrons emitted from a sample by radiation of X-rays is measured. In the air, photoelectrons immediately collide with molecules and are scattered; hence, the inside of an apparatus must be placed in an evacuated state. In addition, photoelectrons emitted from a very deep position of a solid sample are scattered inside the sample and cannot escape therefrom. Accordingly, photoelectrons emitted only from a sample surface are measured by XPS, and hence XPS is an effective surface analytical method. In XPS, the range of the sample surface to a depth of several nanometers can be analyzed.

The kinetic energy E of a photoelectron which is observed is the value obtained by subtracting the energy φ required to transfer an electron located in the crystal to the outside of the sample surface from hν−$E_K$, that is, the value represented by the following formula.

$$E = h\nu - E_K - \phi \quad (7)$$

In this formula, h represents Planck's constant, ν represents the frequency, and $E_K$ represents the electron bond energy. From the above formula (7), it is understood that the value E varies depending on the energy of X-rays from an excitation source. As excited X-rays, in general, characteristic X-rays from an X-ray tube using an aluminum or a magnesium target are used. Although a measurement method of the electron energy is not particularly limited, as a representative method, there may be mentioned an electrostatic field method in which after electrons are introduced into an electrostatic field, only an electron moving along a predetermined trajectory is detected.

Using XPS, the electron bond energy $E_K$ can be measured. Since the bond energy described above is fundamentally an intrinsic value of each element, the type of element can be identified. In addition, from the intensities of photoelectron spectra, the quantities of individual elements can also be determined.

1.2. White Pigment

Examples of the white pigment contained in the ink composition of the present embodiment include oxides of a Group IV element such as titanium dioxide and zirconium dioxide. Examples of the white pigment further include calcium carbonate, calcium sulfate, zinc oxide, barium sulfate, barium carbonate, silica, alumina, kaolin, clay, talc, white earth, aluminum hydroxide, magnesium carbonate, hollow resins, and the like. Preferably, these white pigments may be used singly or as a mixture of two or more pigments selected from the group consisting of these pigments. The hollow resin is not particularly limited and known ones can be used. For example, the particles described in the specifications of U.S. Pat. No. 4,880,465, Japanese Patent No. 3,562,754, and the like can be preferably used. As the white pigment contained in the white ink composition of the present embodiment, titanium dioxide is preferable from the viewpoints of whiteness and abrasion resistance.

The content of the white pigment contained in the ink composition is 0.01 times to 10 times the content of the aluminum pigment. That is, when the content of the aluminum pigment based on the total of the ink composition is, for example, from 0.1% by mass to 5% by mass, the content of the white pigment based on the total of the ink composition is 0.001% by mass to 50% by mass. Further, from the viewpoints of the dispersibility of the white pigment in the water-soluble ink composition, the content of the white pigment is preferably from 0.01% by mass to 20% by mass. Further, from the viewpoints of at least one of increase in the whiteness and increase in the dispersibility in the water-soluble ink composition, the content of the white pigment is preferably from 0.01% by mass to 20% by mass.

Furthermore, with reference to L* values (α1) and degrees of gloss (β1) when the composition obtained by removing the white pigment from the ink composition is printed at a duty of 60%, and L* values (α2) and degrees of gloss (β2) when the ink composition is printed at a duty of 60%, a value calculated by (α2/α1)×(β2/β1) is preferably more than 1, and more preferably 1.5 or more. Further, (α1/α2) is a rate of increase of the L* value and (β2/β1) is a rate of decrease of the degree of gloss at 60°. The printing medium is not particularly limited, but examples thereof include photo paper <Glossy> (Seiko Epson Corporation).

When applied in, for example, printing in the ink jet recording mode, the ink composition of the present embodiment can be adhered on a recording medium to provide a glossy image. At this time, the density as adhered on the recording medium can be defined by, for example, duty.

The "duty" is a value in accordance with the following equation:

Duty(%)=actual number of printed dots/(vertical resolution×horizontal resolution)×100

(wherein, the "actual number of printed dots" is an actual number of printed dots per unit area, and the "vertical resolution" and the "horizontal resolution" each represent the resolution per length area. A duty of 100% indicates the maximum ink weight of a single color per pixel).

The volume-based average particle diameter (hereinafter referred to as an average particle diameter) is not particularly limited, but the white pigment has a volume-based average particle diameter of preferably from 100 nm to 1200 nm, and more preferably from 200 nm to 400 nm. When the average particle diameter is more than the range, the dispersion stability deteriorates, for example, the particles settle down, or the reliability is impaired, for example, the ink jet-type recording head may clog. On the other hand, when the average particle diameter is less than the range, the whiteness tends to be insufficient. The average particle diameter of the white pigment can be measured by a particle size distribution measurement apparatus based on a laser diffraction scattering method as a measurement principle. Examples of the particle size distribution measurement apparatus include a particle size distribution system (for example, "Microtrac UPA" manufactured by Nikkiso Co., Ltd.) based on a dynamic light scattering method as a measurement principle.

By using the white pigment, an ink composition having a high whiteness (L value) and metallic gloss can be obtained.

1.3. Water

The ink composition of the present embodiment is not particularly limited, but can include water. Examples of water used include pure water or ultrapure water, such as ion exchange water, ultrafiltration water, reverse osmosis water, distilled water, and the like. Ions may be present in water unless they do not disturb the dispersion of the aluminum pigments.

In the water-based ink composition of the present embodiment, the content of water in the case of including water is not limited to a range which can maintain the dispersion of the aluminum pigments, but is more preferably from 50% by mass to 95% by mass based on the total amount of the ink composition, and even more preferably from 70% by mass to 95% by mass. If the content of water in the ink composition is within this range, the dispersibility of the aluminum pigment and the white pigment becomes better, and the storage stability can be increased.

Furthermore, the content of water in the non-water-based ink composition of the present embodiment is not limited to a range which can maintain the dispersion of the aluminum pigments, but is more preferably less than 50% by mass based on the total amount of the ink composition. If the content of water in the ink composition is within this range, the dispersibility of the aluminum pigment and the white pigment becomes better, and the storage stability can be increased.

1.4. Other Components

The ink composition of the present embodiment may contain surfactants, polyhydric alcohols, pH modifiers, resins, coloring materials, or the like, as needed. The liquid medium used in the present embodiment may be a water-based or organic one.

Examples of the surfactant include an acetylene glycol-based surfactant and a polysiloxane-based surfactant. These surfactants have an effect of enhancing an impregnation property of ink by improving the wettability to a recording surface. Examples of the acetylene glycol-based surfactant include 2,4,7,9-tetramethyl-5-decyne-4,7-diol, 3,6-dimethyl-4-octyne-3,6-diol, 3,5-dimethyl-1-hexyn-3-ol, 2,4-dimethyl-5-hexyn-3-ol, and the like. In addition, as the acetylene glycol-based surfactant, a commercially available product may also be used, and examples thereof include Olfine (registered trademark) E1010, STG, and Y (all manufactured by Nisshin Chemical Co., Ltd.) and Surfynol (registered trademark) 104, 82, 465, 485, and TG (all manufactured by Air Products and Chemicals Inc.). As the polysiloxane-based surfactant, a commercially available product may be used, and examples thereof include BYK-347 and BYK-348 (manufactured by BYK Japan K. K.), and the like. Furthermore, other surfactants, such as an anionic surfactant, a nonionic surfactant, an ampholytic surfactant, and the like, may be added to the ink composition of the present embodiment.

Examples of the polyhydric alcohol include 1,2-alkanediols having 4 to 8 carbon atoms, such as ethylene glycol, diethylene glycol, triethylene glycol, polyethylene glycol, polypropylene glycol, propylene glycol, butylene glycol, 1,2-butanediol, 1,2-pentanediol, 1,2-hexanediol, 1,2-heptanediol, 1,2-octanediol, and the like, 1,2,6-hexanetriols, thioglycol, hexylene glycol, glycerin, trimethylolethane, trimethylolpropane, and the like. These polyhydric alcohols have an effect of preventing the clogging in the ink jet recording head portion by preventing the ink composition from drying when the ink composition of the present embodiment is applied in an ink jet recording apparatus.

Among these, alkanediols are preferable since they can enhance the impregnation property of ink by increasing the wettability to a recording surface of a recording medium or the like. As the alkanediol, 1,2-hexanediol, 1,2-heptanediol, or 1,2-octanediol, which has 6 to 8 carbon atoms, is more preferable since it has a particularly superior impregnation property to a recording medium.

The pH modifier is not particularly limited, but examples thereof include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, and the like.

Examples of the resin include a homopolymer or a copolymer of acrylic acid, an acrylic ester, methacrylic acid, a methacrylic ester, acrylonitrile, cyanoacrylate, acrylamide, an olefin, styrene, vinyl acetate, vinyl chloride, a vinyl alcohol, a vinyl ether, vinylpyrrolidone, vinylpyridine, vinyl carbazole, vinyl imidazole, vinylidene chloride, or the like, a urethane resin, a fluorinated resin, a natural resin, and the like. In addition, the copolymer may be used in any form of a random copolymer, a block copolymer, an alternate copolymer, and a graft copolymer. These resins can be added to fix the silver particles tightly to a recording medium.

Examples of the coloring material include pigments and dyes, and any coloring material which can be used for ordinary ink can be used without particular limitation. The color of the coloring material which can be added to the ink composition of the present embodiment may be either chromatic or achromatic, but is preferably chromatic since the ink composition is allowed to contain a white pigment. When the ink composition contains a coloring material, for example, metallic gloss as well as color of the gloss can be imparted to the image formed when being coated on the recording medium.

As the dyes used in the ink composition of the present embodiment, there can be used various dyes which are generally used for ink jet recording, such as a direct dye, an acidic dye, a food dye, a basic dye, a reactive dye, a disperse dye, a vat dye, a soluble vat dye, a reactive disperse dye, and the like.

As the pigment which can be used in the ink composition of the present embodiment, there can be used, for example, azo pigments, polycyclic pigments, dye chelates, nitro pigments, nitroso pigments, and the like. When the ink composition of the present embodiment contains a coloring material, plural coloring materials may be contained. For example, in addition to the basic three colors, yellow, magenta, and cyan, the same class of dark colors or pale colors of each color can be added. That is, for example, in addition to magenta, a pale color of light magenta, or dark red can be contained, and in addition to a pale color of light cyan, dark blue can be contained.

If the ink composition of the present embodiment is intended to contain a pigment, the pigment preferably has an average particle diameter in the range of 10 nm to 200 nm, and more preferably from about 50 nm to 150 nm. When the ink composition of the present embodiment contains a coloring material, the amount of addition of the coloring material is preferably in the range of about 0.1% by mass to 25% by mass, and more preferably in the range of about 0.5% by mass to 15% by mass.

Furthermore, when the ink composition contains a pigment, a pigment dispersant for dispersing the pigment may further be added. As a preferable dispersant, a dispersant customarily used for preparation a pigment dispersion, and, for example a polymer dispersant can be used. As this dispersant, any dispersant which is usually used in the ink may be used. When the ink composition contains the pigment dispersant, the content of the pigment dispersant is 5% by mass to 200% by mass, and preferably from 30% by mass to 120% by mass, based on the content of the color material of the ink composition, and may be appropriately selected according to the coloring materials to be dispersed.

Furthermore, the ink composition of the present embodiment may also contain additives including a fixing agent such as a water-soluble rosin and the like, a fungicide/preservative such as sodium benzoate and the like, an antioxidant such as an allophanate and the like, a wetting agent, an ultraviolet ray absorber, a chelating agent, an oxygen absorber, a preservative, an anti-mold agent, and the like. Those additives may be used singly or in combination of two or more kinds thereof.

Furthermore, polar organic solvents such as alcohols (for example, methyl alcohol, ethyl alcohol, propyl alcohol, butyl alcohol, isopropyl alcohol, fluorinated alcohols, and the like), ketones (for example, acetone, methyl ethyl ketone, cyclohexanone, and the like), carboxylic acid esters (for example, methyl acetate, ethyl acetate, propyl acetate, butyl acetate, methyl propionate, ethyl propionate, and the like), ethers (for example, diethyl ether, dipropyl ether, tetrahydrofuran, dioxane, and the like), or the like can be preferably used as an organic liquid medium in the ink composition of the present embodiment.

When the organic liquid medium is used, a polyoxyethylene derivative of a non-ionic surfactant can be further included. As the polyoxyethylene derivative, acetylene glycol-based surfactants can be used. Specific examples thereof include Surfynol 104, 82, 465, and 485, and TG (all available from Air Products and Chemicals, Inc.), and Olfine STG and Olfine E1010 (both are trade names of products manufactured by Nissin Chemical Industry Co., Ltd.).

Further, it is also possible to use other commercial products as the polyoxyethylene derivative. Specific examples thereof include Nissan Nonion (registered trade mark) A-10R and A-13R(NOF Corporation), FLOWLEN TG-740W and D-90 (Kyoeisha Chemical Co., Ltd.), EMALGEN (registered trade mark) A-90 and A-60 (Kao Corporation), and NOIGEN (registered trade mark) CX-100 (Dai-ich Kogyo Seiyaku Co., Ltd.).

Furthermore, a silicone-based surfactant can be added as the non-ionic surfactant. As the silicone-based surfactant, a polyester-modified silicone or a polyether-modified silicone is preferably used. Specific examples thereof include BYK-347, BYK-348, BYK-UV3500, 3510, 3530, and 3570 (manufactured by BYK Japan K.K.).

When the organic liquid medium is used, in the ink composition of the invention, the content of the non-ionic surfactant can be selected appropriately, but is preferably from 0.01 to 10% by weight, and more preferably from 0.05 to 3.0% by weight, based on the content of the pigment in the ink composition.

When the organic liquid medium is used, the ink composition of the invention can contain other additives contained in an ordinary ink composition. Examples of such additives include a stabilizer (for example, an antioxidant or an ultraviolet absorber). As the antioxidant, there can be used, for example, BHA (2,3-butyl-4-oxyanisole) or BHT (2,6-di-t-butyl-p-cresol) and as the ultraviolet absorber, there can be used, for example, a benzophenone compound or a benzotriazole compound. Further, as the surfactant, there can be used any of anionic, cationic, amphoteric and nonionic surfactants.

The ink composition of the invention may contain a glycol ether. The glycol ether contained in the ink composition of the invention includes ethylene glycol-based ethers and propylene glycol-based ethers having as a base either an aliphatic group such as methyl, n-propyl, i-propyl, n-butyl, i-butyl, hexyl, and 2-ethylhexyl, an allyl group having a double bond, or a phenyl group. The glycol ether is a liquid which has no color and little odor, has both characteristics of an alcohol and an ether since it has an ether group and a hydroxyl group in its molecule, and is liquid at a normal temperature.

Examples of the glycol ether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, propylene glycol monomethyl ether, propylene glycol monoethyl ether, dipropylene glycol monomethyl ether, dipropylene glycol monoethyl ether, and the like.

1.5. Applications and Physical Properties of Ink Composition

Applications of the ink composition of the present embodiment are not particularly limited, and can be applied, for example, to a writing tool, a stamp, a recorder, a pen plotter, an ink jet recording apparatus, or the like.

For example, when its application is ink jet recording type printing, the viscosity of the ink composition at 20° C. is preferably from 2 mPa·s to 10 mPa·s, and more preferably from 3 mPa·s to 5 mPa·s. When the viscosity of the ink composition at 20° C. is within the range as described above, an appropriate amount of the ink composition can be ejected from a nozzle, and trajectory deviation and scattering of the ink composition can be further reduced, so that the ink composition can be preferably used for an ink jet recording apparatus.

The ink composition of the present embodiment can be ejected and coated on a recording medium by an ink jet recording apparatus. Also, the ink composition of the present embodiment contains the aluminum pigment as described above, which can allow the coating film to express good metallic gloss when being coated by an ink jet recording method.

Furthermore, the ink composition of the present embodiment contains the white pigment as described, which can allow the coating film to have inhibited coloration of the metallic gloss when being coated by an ink jet recording method. That is, black through brown hues derived from the aluminum pigment being powders are inhibited by the white pigment and metallic gloss having a stronger whiteness (reduced coloration) can be expressed.

Further, the degree of gloss of the image formed on the recording medium by the ink composition can be evaluated in accordance with Japanese Industrial Standard (JIS) Z8741: 1997 "Method for Measurement of Specular Degree of Gloss". The degree of gloss can be calculated, based on the results obtained by, for example, radiating incident light at an incident angle of 20°, 45°, 60°, 75°, and 85° on the surface on which an image is formed, installing a light detector in the direction of the reflection angle, and measuring the intensity of light. Examples of the apparatus with which such measurement can be conducted include MULTI GLOSS 268 manufactured by Konica Minolta Holdings, Inc., GlossMeter Model No. VGP5000 manufactured by Nippon Denshoku Industries Co., Ltd., and the like.

Furthermore, the whiteness of the image formed on the recording medium by the ink composition can be evaluated by using, for example, the L* value of the image. The L* value of the image can be measured using, for example, a commercially available spectroscopic apparatus, "938 Spectrodensitometer" (manufactured by X-Rite Inc.), and the like.

2. Recording Method

The recording method of the present embodiment includes ejecting the ink composition as described above using an ink jet-type recording head and adhering it on a recording medium. One example of the methods in which an ink composition is ejected on a recording medium by an ink jet recording apparatus and adhered on the recording medium to form a group of dots is presented below.

2.1. Ink Jet-Type Recording Head

The system of the ink jet-type recording apparatus is, for example, a system in which a strong electric field is coated between a nozzle and an acceleration electrode disposed ahead of the nozzle to sequentially eject ink droplets from the nozzle and a printing information signal is coated to a deflection electrode, for recording, while the ink droplets are traveling between the deflection electrodes; a system (electrostatic attraction system) in which ink droplets are ejected according to printing information signals without deflecting the ink droplets; a system in which an ink solution is coated with a pressure by a small-sized pump and a nozzle is mechanically vibrated using a quartz oscillator or the like to forcedly eject the ink droplets; a system (piezoelectric system) in which a piezoelectric element simultaneously applies a pressure and a printing information signal to an ink solution to eject ink droplets for recording; a system (thermal jet system) in which an ink solution is heated with a microelectrode according to a printing information signal to form foam for ejecting ink droplets for recording; and the like. The recording method of the present embodiment may use any of the ink jet-type recording heads.

Examples of the ink jet recording apparatus used in the present embodiment include ones including the ink jet-type recording head, a body, a tray, a head-driving mechanism, a carriage, and the like. The ink jet-type recoding head includes ink cartridges receiving at least four colors ink sets, cyan, magenta, yellow, and black, and is configured so as to be capable of full color printing. In the present embodiment, at least one of these ink cartridges or more exclusive-use cartridges are provided, filled with the ink composition described above, and set. In addition, other cartridges may be filled with the usual ink. The ink jet-type recording apparatus is equipped with an exclusive-use control board or the like inside, and can control the ink ejecting timing of the ink jet-type recording head and scanning of the head driving mechanism.

2.2. Recording Medium

The kind of the recording medium on which the ink composition by the recording method of the present embodiment is adhered is not particularly limited. Examples of the recording medium used in the recording method of the present embodiment include absorptive recording media such as paper, porous films, cloth, and the like. In addition, the recording medium may be, for example, a recording medium having a substrate having no ink absorptivity, such as plastic and the like.

The recording medium may be any one of gloss-type, matte-type, and dull-type ones. Specific examples of the recording medium include surface-processed paper such as coated paper, art paper, cast coated paper, and the like, vinyl chloride sheets on which an ink-receiving layer is formed, plastic films such as a PET film and the like, and others.

According to the recording method of the present embodiment, the ink composition described above is used, and thus, an image having good metallic gloss on a recording medium and also having less coloration (good whiteness) can be recorded. Further, when the primary particle diameter of the white pigment included in the ink composition is set to be 100 nm to 2 μm, the content of the white pigment can be reduced and also, an image having a superior balance between whiteness and metallic gloss can be recorded.

Embodiment B

1. Ink Composition

The ink composition according to the present Embodiment B includes silver particles, a white pigment, and water.

1.1. Silver Particles 1.1.1. State and Properties of Silver Particles

The silver particles included in the ink composition of the present embodiment are particles having silver as a main component. The silver particles may contain, for example, other metals, oxygen, carbon, and the like as auxiliary components. The purity of silver in the silver particles can be, for example, 80% or more. The silver particles may be an alloy of silver and another metal. Further, the silver particles in the ink composition may be present in the state of the colloid (colloidal particles). When the silver particles are dispersed in the state of the colloid, the dispersibility is further improved, and thus can contribute to, for example, the storage stability of the ink composition.

The particle diameter d90 in the particle diameter accumulation curve of the silver particles is 50 nm to 1 μm. As mentioned herein, the particle diameter accumulation curve is one kind of curve obtained by statistically processing the results from the measurement for determining the diameters of the particles and the number of the existing particles for the silver particles dispersed in liquid, such as an ink composition and the like. The particle diameter accumulation curve in the present specification is the curve in which the diameters of the particles are taken in the horizontal axis, and for the mass of the particles (a product of the volume when the particle is considered as a sphere, the density of the particles, and the number of the particles), values (integrated values) obtained by accumulation from a particle having a smaller diameter to a particle having a larger diameter are taken in the longitudinal axis. Further, the particle diameter d90 refers to a value on the horizontal axis when the value on the longitudinal axis is 90% (0.90) with the longitudinal axis being normalized (a total mass of the particles measured being 1), that is, a diameter of the particle. In addition, the diameter of the silver particle in this case may be the diameter of the silver particle itself, or when the silver particles are dispersed in the colloidal form, it may also be the diameter of the colloidal particle.

The particle diameter accumulation curve of the silver particles can be determined, for example, by using a particle diameter distribution measurement apparatus based on a dynamic light scattering method. The dynamic light scattering method is a method for radiating laser light to the silver particles dispersed and observing the scattered light by mean of a photon detector. Generally, the silver particles dispersed usually display Brownian motion. For the speed of the motion of the silver particle, a larger particle having a particle diameter has a larger speed whereas a particle having a smaller particle diameter has a smaller speed. If laser light is radiated onto the silver particle in the Brownian motion, fluctuation corresponding to the Brownian motion of the silver particles in the scattered light is observed. The diameters of the silver particles and the frequency (number) of the silver particles corresponding to the diameters can be determined by measuring the fluctuation, determining a self-correlation function by means of a photon correlation method or the like, and using a cumulant method, analysis by a histogram method, or the like. Particularly, for the samples including silver particles having submicron sizes, a dynamic light scattering method is suitable, and the particle diameter accumulation curve can be relatively easily obtained by the dynamic light scattering method. Examples of the particle diameter distribution measurement apparatus based on the dynamic light scattering method include Nantotrac UPA-EX150 (manufactured by Nikkiso Co., Ltd.), ELSZ-2, DLS-8000 (all manufactured by Otsuka Electronics Co., Ltd.), LB-550 (manufactured by Horiba, Ltd.), and the like.

Furthermore, the particle diameter accumulation curve of the silver particles can be measured, for example, by electron microscopy, even in the ink composition containing an aqueous dispersion of silver particles in the present embodiment. In this method, the particle diameter accumulation curve of the silver particles can be obtained by measuring the sizes of the silver particles from the electron micrographs, and measuring the photographs, for example, by an image treatment. Specifically, there can be mentioned a method in which the long axis diameter and the short axis diameter of the individual silver particle are measured, the diameter of a circle having the same area (circle-equivalent diameter) is arithmetically determined, and 50 or more silver particles are randomly selected from a certain viewing field and determined. According to this method, for example, even when particles other than the silver particles in the ink composition (for example, white pigments) are contained, the silver particles can be screened in the electron microscope image, and thus, the particle diameter accumulation curve of the silver particles can be obtained. Further, when there is an intention to increase the reliability in this measurement, the number of particles to be measured may be increased for determination.

Furthermore, in the measurement by electron microscopy, when particles such as pigments and the like other than the silver particles are found on the electron microscope image, the pigments other than the silver particles, and the like can be screened, for example, by using an EDX (Energy Dispersive X-ray analysis) method. In addition, even when the ink composition of the present embodiment is adhered on the recording medium (for example, a printed material), the particle diameter accumulation curve of the silver particles can be obtained by using electron microscopy, and optionally, in combination with an EDX method.

Moreover, in the ink composition of the present embodiment including an aqueous dispersion of silver particles and a white pigment, examples of the method for obtaining the particle diameter accumulation curve of the silver particles additionally include a method using centrifugal separation (hereinafter also referred to as a centrifugation method in some cases). In a specific example of the centrifugation method, a centrifuge tube having a length of 10 cm is filled with the ink composition, centrifugation is carried out, for example, at 1000 rpm for 5 hours, and then the fractions at 1 cm from the top of the tube and at 1 cm from the bottom of the tube are collected. The specific gravity of silver is approximately 10.5 g/cm$^3$ and the specific gravity of titanium dioxide is approximately 3.9 g/cm$^3$, and thus, this density difference leads to different positions in the centrifuge tube after centrifugal separation. For this reason, for example, the silver particles are concentrated in the fraction at 1 cm from the bottom of the tube, and the supernatant collected from the fraction at 1 cm from the top of the tube, a white pigment becomes dispersed therein. Therefore, the dispersion is collected from an appropriate position of the centrifuge tube, and measured by means of the dynamic light scattering method as described above or the like, and thus, in the ink composition including the aqueous dispersion of silver particles and the white pigment, the particle diameter accumulation curve of the silver particles and the particle diameter accumulation curve of the white pigment can be obtained, respectively.

The silver particles used in the ink composition of the present embodiment may have a particle size d10 from 2 nm to 20 nm in the particle diameter accumulation curve. By this, the dispersibility of the silver particles in the ink composition can be improved, and, for example, the storage stability can be increased. Further, the particle diameter d10 refers to a value on the horizontal axis when the value on the longitudinal axis is 10% (0.10) with the longitudinal axis being normalized (a total mass of the particles measured being 1), that is, a diameter of the particle.

The concentration of the silver particles in the ink composition of the present embodiment is preferably from 0.1% by mass to 30% by mass, more preferably from 1% by mass to 20% by mass, and particularly preferably from 5% by mass to 15% by mass, based on the total mass of the ink composition.

1.1.2. Method for Preparing Silver Particles

The silver particles used in the ink composition of the present embodiment are not limited by the preparation method, but can be prepared, for example, as follows. Hereinbelow, some of the methods for preparing the silver particles and the silver colloid particle dispersion will be exemplified.

1.1.2.1. First Approach

The method for preparing the silver particles as exemplified below includes at least a first solution-preparing step for preparing a first solution including at least a polymer of vinylpyrrolidone and a polyhydric alcohol, a second solution-preparing step for preparing a second solution in which silver precursors capable of being reduced to silver (metal) are dissolved in a solvent, a first solution-heating step in which the first solution is heated to a predetermined temperature, a mixing step in which the heated first solution and the second solution are mixed to obtain a mixed liquid, a reaction-processing step in which the mixed liquid is maintained at a predetermined temperature for a certain period of time, and a dispersing step in which the silver particles (silver colloidal particles) are taken from the mixed liquid in which the reaction is processed and dispersed in a water-based dispersion medium.

First Solution-Preparing Step

First, a first solution including at least a polymer of vinylpyrrolidone and a polyhydric alcohol is prepared.

As one of the functions of vinylpyrrolidone as a polymer of the first solution, there may be mentioned that vinylpyrrolidone is adsorbed on the surface of the silver particles prepared by the preparation method in the present example and thus, prevents agglomeration of the silver particles, thereby forming colloidal silver particles.

Examples of the polymers of vinylpyrrolidone used may also include a homopolymer of vinylpyrrolidone (polyvinylpyrrolidone) and a copolymer of vinylpyrrolidone.

Examples of the copolymer of vinylpyrrolidone include a copolymer of vinylpyrrolidone and an α-olefin, a copolymer of vinylpyrrolidone and vinyl acetate, a copolymer of vinylpyrrolidone and dimethylaminoethyl(meth)acrylate, a copolymer of vinylpyrrolidone and (meth)acrylamidepropyl trimethylammoniumchloride, a copolymer of vinylpyrrolidone and vinylcaprolactam dimethylaminoethyl(meth)acrylate, a copolymer of vinylpyrrolidone and styrene, a copolymer of vinylpyrrolidone and (meth)acrylic acid, and the like.

When polyvinylpyrrolidone is used as the polymer of vinylpyrrolidone, the weight average molecular weight of the polyvinylpyrrolidone is preferably from 3000 to 60000.

The polyhydric alcohol is a compound which functions to reduce a silver precursor included in the second solution to silver (metal).

Examples of the polyhydric alcohol include ethylene glycol, propylene glycol, butylene glycol, diethylene glycol, triethylene glycol, tetraethylene glycol, dipropylene glycol, tripropylene glycol, 1,3-propanediol, 1,2-butanediol, 2,3-butanediol, 1,3-butanediol, 1,4-butanediol, glycerol, trimethylol propane, pentaerythritol, triethanolamine, trihydroxymethylaminomethane, and the like.

By dissolving the polymer of vinylpyrrolidone as above in the polyhydric alcohol, the first solution is prepared.

Furthermore, the polymer of vinylpyrrolidone is preferably heated to from 70° C. to 120° C. for the purpose of removing excess moisture, impurities, and the like. Also, the heating time in this case is preferably from 8 hours or longer.

Furthermore, the first solution may also contain a reducing agent which reduces the silver precursor in the second solution, apart from the polyhydric alcohol.

Examples of the reducing agent include hydrazine and a derivative thereof; hydroxylamine and a derivative thereof; monovalent alcohols such as methanol, ethanol, and the like; formaldehyde, formic acid, acetaldehyde, propionaldehyde, and aldehydes of their ammonium salts; hypophosphite; sulfite; tetrahydroborate (for example, tetrahydroborates of Li, Na, and K); lithium aluminum hydride (LiAlH$_4$); sodium borohydride (NaBH$_4$); polyhydroxybenzenes such as hydroquinone, alkyl-substituted hydroquinone, catechol, pyrogallol, and the like; phenylenediamine and derivatives thereof; aminophenol and derivatives thereof; carboxylic acids and their derivatives such as ascorbic acid, citric acid, ascorbic acid ketal, and the like; 3-pyrazolidone and a derivative thereof; hydroxytetronic acid, hydroxytetronic acid amide and derivatives thereof; bis/naphthols and derivatives thereof; sulfonamidephenol and a derivative thereof; Li, Na and K, and the like. Among these, ammonium formate, formic acid, formaldehyde, acetaldehyde, propionaldehyde, ascorbic acid, citric acid, sodium borohydride, lithium aluminum hydride, and lithium borohydride triethyl are preferably used, and ammonium formate is more preferably used.

Second Solution-Preparing Step

Next, a second solution of silver precursors dissolved in a solvent which is capable of being reduced to silver is prepared.

The silver precursor is a compound which produces silver (metal) by reducing the polyhydric alcohol and reducing agents as described above.

Examples of such silver precursors include inorganic and organic acid salts of silver, such as oxides, hydroxides (including hydrated oxides), nitrate, nitrite, sulfate, halides (for example, fluoride, chloride, bromide, and iodide), carbonates, phosphates, azides, borates (including fluoroborate, pyrazolylborate, and the like), sulfonate, carboxylates (for example, formate, acetate, propionate, oxalate ester, and citrate), substituted carboxylates (including halogenated carboxylates such as trifluoroacetate and the like, hydroxycarboxylate, aminocarboxylate, and the like), hexachloroplatinate, tetrachloroaurate, tungstates, and the like, silver alkoxides, silver complexes, and the like.

The solvent is not particularly limited as long as it dissolves the silver precursor as described above, and for example, polyhydric alcohols as described in the first solution-preparing step, aliphatic, cycloaliphatic, or aromatic alcohols (in this specification, simple reference to "alcohol" represents "a monovalent alcohol"), ether alcohols, amino alcohols, and the like can be used.

The silver precursor as described above is dissolved in a solvent to obtain a second solution.

Mixing Step

Next, the first solution and the second solution are mixed to obtain a mixing liquid.

In this case, the temperature of the first solution is preferably from 100° C. to 140° C., more preferably from 101° C. to 130° C., and even more preferably from 115° C. to 125° C. Thus, the silver precursor in the second solution can be more efficiently reduced and also, vinylpyrrolidone can be efficiently adsorbed on the surface of the silver particles formed.

Reaction-Processing Step

Subsequently, the mixing liquid obtained by mixing the first solution and the second solution is heated at a predetermined temperature for a certain period of time to process the reduction reaction of the silver precursor.

The heating temperature herein is preferably from 100° C. to 140° C., more preferably from 101° C. to 130° C., and even more preferably from 115° C. to 125° C. Thus, the silver precursor can be more efficiently reduced and also, vinylpyrrolidone can be efficiently adsorbed on the surface of the silver particles formed.

Furthermore, the heating time (reaction time) also depends on the heating temperature, but is preferably from 30 minutes to 180 minutes, more preferably from 30 minutes to 120 minutes, and even more preferably from 60 minutes to 120 minutes. Thus, the silver precursor can be more reliably reduced and also, vinylpyrrolidone can be efficiently adsorbed on the surface of the silver particles formed.

Dispersing Step

Then, if necessary, the silver particles formed (silver colloidal particles) are separated by filtration, centrifugal separation, or the like, and the separated silver particles are dispersed in a water-based dispersion medium to a desired concentration. Thus, silver particles, ink compositions, or aqueous silver colloidal dispersions can be obtained.

1.1.2.2. Second Approach

For the method for preparing the silver particles exemplified below, first, an aqueous solution, a dispersant and a reducing agent are dissolved is prepared. The dispersant is not particularly limited, but examples thereof include hydroxyl acids or a salt thereof having three or more of COOH groups and OH groups in total, in which the number of the COOH groups is equal to or more than that of the OH groups. One of the functions of the dispersant is that the dispersant adsorbs onto the surface of the silver particles to form colloidal particles, and evenly disperses the silver colloidal particles in the aqueous solution by electrical repulsion of the COOH groups present in the dispersant to stabilize a colloidal liquid. By blending the dispersant, the silver colloidal particles can be stabilized and thus, can be present in the dispersion medium. Therefore, for example, the dispersion stability can be further increased.

Examples of such dispersants include citric acid, malic acid, trisodium citrate, tripotassium citrate, trilithium citrate, ammonium citrate tribasic, disodium malate, tannic acid, gallotannic acid, gallnut tannin, and the like. These may be used singly or in combination of two or more kinds thereof.

In addition, the dispersant may include mercapto acids or a salt thereof having two or more of COOH groups and SH groups in total. The dispersant has an equal or stronger ability for adsorbing mercapto groups onto the surface of the silver particles than that of hydroxyl groups, and thus, its function of easily forming the colloidal particles, and evenly dispersing the colloidal particles in the aqueous solution by electrical repulsion of the COOH groups present in the dispersion medium so as to stabilize a colloidal liquid may be improved in some cases. Examples of such dispersants include mercaptoacetic acid, mercaptopropionic acid, thiodipropionic acid, mercaptosuccinic acid, thioacetic acid, sodium mercaptoacetate, sodium mercaptopropionate, sodium thiodipropionate, disodium mercaptosuccinate, potassium mercaptoacetate, potassium mercaptopropionate, potassium thiodipropionate, dipotassium mercaptosuccinate, and the like, and these may be used singly or in combination of two or more kinds thereof.

The dispersant is preferably blended in such a blending amount that a molar ratio between the silver of the silver salt such as silver nitrate which is a starting material and the dispersant is set to be about 1:1 to 1:100. If the molar ratio of the dispersant with respect to the silver salt is increased, the particle diameters of the silver particles are decreased, and thus, the dispersibility can be further increased.

As one of the functions of the reducing agent, there may be mentioned that the reducing agent reduces Ag$^+$ ions in the silver salt such as silver nitrate (Ag$^+$NO$_3^-$) which is a starting material so as to produce silver particles.

The reducing agent is not particularly limited, and examples of the reducing agent include amine-based reducing agents such as hydrazine, dimethylaminoethanol, methyldiethanolamine, triethanolamine, and the like, hydrogen compound-based reducing agents such as sodium borohydride, hydrogen gas, hydrogen iodide, and the like, oxide-based reducing agents such as carbon monoxide, sulfurous acid, hypophosphite, and the like, low-valent metal salt-based reducing agents such as Fe(II) compounds, Sn(II) compounds, and the like, sugar-based reducing agents such as D-glucose and the like, organic compound-based reducing agents such as formaldehyde and the like, hydroxy acid-based reducing agents such as citric acid, malic acid, hydroxyl acid salt-based reducing agents such as trisodium citrate, tripotassium citrate, trilithium citrate, ammonium citrate tribasic, disodium malate, tannic acids, etc. Among these, tannic acids and hydroxy acids are preferably used since they function not only as the reducing agent but also the dispersant. As the dispersant for forming a stable bond on the surface of silver, mercapto acids such as mercaptoacetic acid, mercaptopropionic acid, thiodipropionic acid, mercaptosuccinic acid, thioacetic acid, or mercaptoacid salts such as sodium mercaptoacetate, sodium mercaptopropionate, sodium thiodipropionate, sodium mercaptosuccinate, potassium mercaptoacetate, potassium mercaptopropionate, potassium thiodipropionate, potassium mercaptosuccinate, and the like can be preferably used.

These dispersants and reducing agents may be used singly or in combination of two or more kinds thereof. Further, when any of these compounds is used, the reduction reaction may be promoted with light or heat.

Any blending amount of the reducing agent is available as long as the amount of the reducing agent can completely reduce a silver salt which is the starting substance. However, it should be blended at a minimum necessary amount, because if the reducing agent is blended excessively, it remains in the silver colloidal liquid as an impurity, causing deterioration of the conductivity after film forming. Specifically, the reducing agent is blended in such a blending amount such that a molar ratio between the silver salt and the reducing agent is set to be about 1:1 to 1:3.

In this example of the preparation method, after the aqueous solution is prepared by dissolving the dispersant and the reducing agent, the pH of the aqueous solution is preferably adjusted to be 6 to 12. This is because of the following reasons. For example, in a case where trisodium citrate serving as the dispersant and ferrous sulfate serving as the reducing agent are blended, a pH is usually about 4 to 5, that is, lower than 6 which is described above, though it varies depending on the overall concentration. In this case, present hydrogen ions shift the equilibrium of the following reaction formula (1) to the right side, increasing the amount of COOH. Therefore, thereafter, the electrical repulsion of the surface of the silver particles that are obtained by delivering a silver salt solution by drops into the aqueous solution after this mixing is reduced, thereby reducing the dispersibility of the silver particles (colloidal particles).

$$—COO^- + H^+ \leftrightarrow —COOH \qquad (1)$$

Accordingly, after the aqueous solution is prepared by dissolving the dispersant and the reducing agent, an alkaline compound is added to the aqueous solution so as to decrease the concentration of hydrogen ions, and thus, a reduction in the dispersibility can be inhibited.

The alkaline compound to be added is not especially limited, but sodium hydroxide, potassium hydroxide, lithium hydroxide, aqueous ammonia, alkanolamines as described above, or the like can be used. Among these, when alkanolamines are used, the pH can be easily adjusted and the dispersion stability of the silver colloidal particles formed can be further improved.

Furthermore, if a pH exceeds 12 when the amount of addition of the alkaline compound is too high, hydroxides of ions, such as ferric ions, of the reducing agent that remains, is easily precipitated, which is thus not preferable.

Next, in this example of the preparation method, an aqueous liquid containing silver salt is delivered by drops into the aqueous solution in which the dispersant and the reducing agent that are prepared are dissolved. The silver salt is not especially limited, but silver acetate, silver carbonate, silver oxide, silver sulfate, silver nitrite, silver chlorate, silver sulfide, silver chromate, silver nitrate, silver dichromate, or the like can be used. Among these, silver nitrate having a high solubility with respect to water is particularly preferable.

Furthermore, the amount of the silver salt is determined in view of a desired content of the colloidal particles and a desired reducing ratio by the reducing agent. In a case of silver nitrate, the amount is preferably about from 15 parts by mass to 70 parts by mass with respect to 100 parts by mass of the aqueous solution.

The aqueous silver salt solution is prepared by dissolving the silver salt in pure water, and the prepared aqueous silver salt solution is gradually delivered by drops into the aqueous solution in which the dispersant and the reducing agent described above are dissolved. In this step, the silver salt is reduced to silver particles by the reducing agent and the dispersant adsorbs onto the surface of the silver particles so as to form silver colloidal particles. Thus, an aqueous solution in which the silver colloidal particles are dispersed in the colloidal state can be obtained.

The resulting solution contains residues of the reducing agent and the dispersant as well as the colloidal particles, showing a high ionic concentration of the entire liquid. In the liquid in such state, coagulation and precipitation easily occur. Therefore, washing is more preferably conducted so as to remove extra ions in the aqueous solution and decrease the ionic concentration.

Examples of the washing method include a method in which the following steps are repeated several times: leaving the aqueous solution containing the colloidal particles at rest for a certain period, removing a supernatant solution that is prepared from the aqueous solution, adding purified water to the solution and stirring the solution again, further leaving the solution to stand still for a certain period, and removing a newly produced supernatant solution, a method in which centrifugal separation is conducted instead of the leaving at rest, a method in which ions are removed by ultrafiltration or the like, and others.

Alternatively, the following method may be used for washing. After the solution is prepared, a pH of the solution is adjusted to be in an acid range that is 5 or less, and the electrical repulsion of the surface of the silver particles is reduced by shifting the equilibrium of the reaction formula (1) to the right side of the formula so as to conduct the washing in a state that the silver colloidal particles are actively agglomerated. Thus, the salts and the solvent can be removed. The silver colloidal particles that have a sulfuric compound having a low molecular weight, such as mercapto acid, on their surfaces as the dispersant, form stable bonds on the metal surfaces. Therefore, if the pH of the solution is adjusted again to be in an alkaline range that is 6 or more, the silver colloidal particles that are agglomerated are easily dispersed again, being able to obtain the metallic colloidal liquid exhibiting excellent dispersion stability.

In this example of the preparation method, it is preferable that after the above step, an aqueous alkali hydroxide metal solution be optionally added to the aqueous solution in which the silver colloidal particles are dispersed so as to finally adjust the pH to be 6 to 11. Since the washing is conducted after the reduction in the example of the preparation method, the concentration of sodium that is an electrolyte ion is sometimes decreased. In the solution in such state, the equilibrium of the reaction formula (2) shifts to the right side of the formula. In such a state, the electrical repulsion of the silver colloid is decreased, so that the dispersibility of the silver particles is decreased. Therefore, the equilibrium of the reaction formula (2) is shifted to the left side by adding an appropriate amount of alkali hydroxide, stabilizing the silver colloid.

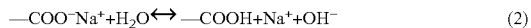

$$-COO^-Na^+ + H_2O \longleftrightarrow -COOH + Na^+ + OH^- \quad (2)$$

Examples of the alkali hydroxide metal used herein include the compounds which are the same as the compound used when the pH is first adjusted. When the pH is less than 6, the equilibrium of the reaction formula (2) shifts to the right side, making the colloidal particles unstable, whereas when the pH is more than 11, hydroxide salts of remaining ions such as an iron ion easily precipitate, which is thus not preferable. Here, if the iron ions and the like are removed in advance, a pH of more than 11 does not have a large inadverse effect.

Furthermore, cations such as sodium ions and the like are preferably added in the form of a hydroxide. This is because self-protolysis of water can be used, and thus, cations such as sodium ions and the like can be most effectively added to the aqueous solution. Further, in the step above for adjusting the pH to be 6 to 11, alkanolamines may be used instead of an aqueous alkali hydroxide metal solution.

1.1.2.3. Third Approach

The method for preparing the silver particles as exemplified below includes an aqueous oxidative polymerization product solution-preparing step for preparing an oxidative polymerization product solution having an oxidative polymerization product of a phenolic compound dissolved in a solvent, a silver compound solution-preparing step for preparing a silver compound solution having a silver compound dissolved therein, and a mixing/reducing step for mixing the aqueous oxidative polymerization product solution and the silver compound solution, and reducing the silver compound to obtain fine particles of silver.

Oxidative Polymerization Product Solution-Preparing Step

In the present step, an oxidative polymerization product solution having an oxidative polymerization product of a phenolic compound dissolved in a solvent is prepared.

The oxidative polymerization product of the phenolic compound has a reductive ability, and thus, can reduce the silver compound as described below. Further, oxidized products obtained by a reduction reaction or the like of the oxidative polymerization product of the phenolic compound, or excess material can be present on the surface of the resulting fine particles of silver by coordination, adsorption, or the like, and thus, a silver colloidal liquid in which the silver colloidal particles are dispersed can be obtained.

As the oxidative polymerization product of the phenolic compound, a carbon-condensed polycyclic compound produced by oxidizing a part of the phenolic compound molecule to bind two or more molecules for polymerization can be used.

Specifically, at least one selected from the following (1) to (4) is preferably used: (1) dihydroxydibenzofuran-dione and a derivative thereof in which the hydroxyl groups are substituted at 2 positions selected from the 1-position to 4-position and the carbonyl groups are substituted at 2 positions selected from the 5-position to 8-position, for example 1,2-dihydroxydibenzofuran-7,8-dione, 2,4-dihydroxydibenzofuran-5,7-dione, 1,2-dihydroxy-4,5-dicarboxydibenzofuran-7,8-dione, and the like, (2) tetrahydroxy-5H-benzo[7]annulen-5-one and a derivative thereof in which the hydroxyl groups are substituted at 2 positions selected from the 1-position to 3-position, at 1 position of the 4-position, and at 1 position selected from the 6-position and the 7-position, for example 2,3,4,6-tetrahydroxy-5H-benzo[7]annulen-5-one (generic name purpurogallin), and the like, (3) compounds obtained by further subjecting the compound of (1) or (2) above to oxidative polymerization, and (4) compounds obtained by further subjecting at least one compound selected from (1) to (3) above and at least one selected from divalent and trivalent phenolic compounds, and a derivative thereof to oxidative polymerization. Herein, the derivative refers to a compound produced by the change in the intramolecular moiety of the oxidative polymerization product, for example, products obtained by substituting hydrogen atoms included in the oxidative polymerization product with alkyl groups, halogen atoms, hydroxyl groups, carboxyl groups, or the like.

The oxidative polymerization product of the phenolic compound can be obtained by oxidizing the phenolic compound with an oxidizing agent, and the polymerization degree can be controlled by the amount of addition of the oxidizing agent, the oxidization reaction time, or the like. Specifically, the oxidative polymerization product can be obtained by mixing a phenolic compound and an oxidizing agent, or dissolving a phenolic compound in a water-based solvent, an organic solvent such as alcohols and the like, or a mixed solvent of the aqueous solvent and the organic solvent such as alcohols and the like, and then mixing the solution and an oxidizing agent.

As an oxidizing agent, for example, oxidizing gases such as air, oxygen, and the like, or compounds such as hydrogen peroxide, permanganic acid, potassium permanganate, sodium iodate, and the like can be used, and particularly, it is economically beneficial and preferable to use air.

When using an oxidizing gas as the oxidizing agent, the mixing of the solution having the phenolic compounds dissolved in a solvent (phenolic compound solution) with an oxidizing gas such as air and the like may be carried out by stirring the solution in an open system or by bubbling oxidizing gases such as air and the like in the solution.

It is preferable to use a water-based solvent as the solvent in terms of easy handling and economy as for the metal compound solution as described below. When the phenolic compound is oxidized, the transparent solution is discolored into a reddish-brown solution, a brownish-red solution, a dark brown solution, and the like, and as the polymerization proceeds, the color becomes darker, and thus, production of the oxidative polymerization product can be confirmed visually. When the pH of the solution of the phenolic compound is adjusted to 6 or more, the polymerization easily proceeds, which is thus preferable. The pH is more preferably in the range of 6 to 13, and even more preferably in the range of 8 to 11.

Furthermore, the oxidative polymerization product is preferably obtained by subjecting a divalent or trivalent phenolic compound or a derivative thereof to oxidative polymerization under the above-referenced conditions. Examples of the divalent phenolic compound include hydroquinone, catechol, resorcinol, and the like, examples of the trivalent phenolic compound include pyrogallol, phloroglucinol, 1,2,4-trihydroxybenzene, and the like, and examples of their derivatives include gallic acid which is a derivative of pyrogallol, and the like. These can be used singly or in combination of two or more kinds thereof. Among those described above, ones having 3 hydroxyl groups are preferable, and pyrogallol, phloroglucinol, and 1,2,4-trihydroxybenzene are more preferably used.

Specific examples of the oxidative polymerization product of pyrogallol include carbon-condensed polycyclic compounds such as 1,2-dihydroxydibenzofuran-7,8-dione, purpurogallin (2,3,4,6-tetrahydroxy-5H-benzo[7]annulen-5-one), and the like. Further, examples of the oxidative polymerization product of phloroglucinol include carbon-condensed polycyclic compounds such as 2,4-dihydroxydibenzofuran-5,7-dione and the like. Further, examples of oxidative polymerization product of 1,2,4-trihydroxybenzene include carbon-condensed polycyclic compounds such as 1,3-dihydroxydibenzofuran-6,8-dione, 1,3,4,7-tetrahydroxy-5H-benzo[7]annulen-5-one and the like.

Furthermore, examples of the derivatives of the divalent or trivalent phenolic compounds include carbon-condensed polycyclic compounds such as 1,2-dihydroxy-4,5-dicarboxydibenzofuran-7,8-dione, and the like, which are the oxidative polymerization products of gallic acid.

In addition, the products obtained by further subjecting the polycyclic compounds to oxidative polymerization or the products obtained by subjecting the polycyclic compounds or the oxidative polymerization products thereof, and at least one selected from divalent and trivalent phenolic compounds and derivatives thereof to oxidative polymerization, and derivatives thereof can be prepared and used.

Silver Compound Solution-Preparing Step

On the other hand, a silver compound solution having the silver compound dissolved therein is prepared.

The silver compound is a compound which becomes silver (metal) by reduction and is a raw material for preparing the silver particles.

As the silver compound, for example, the chloride, sulfate, nitrate, carbonate, acetate, and the like of silver can be used. As the solvent in which the silver compound is dissolved, water and an organic compound such as alcohols and the like, or a mixture of water and the organic compound can be used, and it is preferable to use water as a solvent in terms of easy handling and economy. The concentration of the silver compound in the solvent is not particularly limited as long as it is in the range for dissolving the silver compound, but is preferably 5 mmol/L or more from industrial viewpoints.

Mixing/Reducing

Next, the oxidative polymerization product solution and the silver compound solution are mixed under stirring, and the silver compound is reduced to prepare the particles of silver.

The amount of the oxidative polymerization product to be used is not particularly limited, but is preferably an amount in the range of a 0.1 to 10 molar ratio, and more preferably an amount in the range of a 0.2 to 5 molar ratio of the silver compound, based on a single form of the phenolic compound.

The reduction temperature can be set appropriately, but the reduction is preferably carried out in the range of 5° C. to 105° C., and more preferably from 10° C. to 80° C.

Furthermore, for the reduction reaction above, other reducing agents, for example, amines and alcohols may be added auxiliarily. In this way, silver particles can be prepared, and optionally, dialysis, solid-liquid separation, or washing can be carried out so as to remove excess components and unwanted ion components, or optionally drying or the like can be carried out.

At least one of the oxidative polymerization product of the phenolic compound and the oxidant of the oxidative polymerization product is present on the surface of the silver particles prepared by such a reduction reaction and constitutes the silver colloidal particles. As a result, for example, by dispersing in water, a colloidal silver liquid can be obtained easily.

1.2. White Pigment

As the white pigment contained in the ink composition of the present embodiment, the white pigments which are the same as used in Embodiment A can be used.

The content of the white pigment contained in the ink composition is 1% to 10% of the content of the silver particles. That is, when the content of the silver particles based on the total of the ink composition is, for example, from 0.1% by mass to 30% by mass, the content of the white pigment based on the total of the ink composition is 0.001% by mass to 3% by mass. Further, from the viewpoints of the dispersibility of the white pigment in the water-soluble ink composition, the content of the white pigment is preferably from 0.01% by mass to 1% by mass. In addition, from the viewpoints of at least one of increase in the whiteness and increase in the dispersibility in the water-soluble ink composition, the content of the white pigment is preferably from 0.1% by mass to 1% by mass.

The ink composition of the present embodiment can be adhered to a recording medium to provide a glossy image when its application is, for example, ink jet recording type printing. In this case, the density thereof adhered to the recording medium can be defined, for example, by a duty.

The ink composition of the present embodiment can also improve the balance between the whiteness and the degree of gloss in the image with a lower duty. For example, the content of the white pigment based on the silver particles can be set to be 1% to 4% to improve the balance between the whiteness and the degree of gloss in the image with a lower duty.

For the white pigment, the value of the particle diameter d50 in the particle diameter accumulation curve is more preferably from 100 nm to 2 μm. When the white pigment has a particle diameter d50 in such a range, for example, the whiteness of the printing can be improved. Measurement of the particle diameter accumulation curve of the white pigment can be carried out by at least one of, in the same manner as the case of the silver particles as described above, for example, a dynamic light scattering method, electron microscopy (optionally in combination with an EDX technique), and a centrifugation method.

1.3. Water

Water used in the ink composition of the present embodiment is, for example, pure water or ultrapure water such as ion exchange water, ultrafiltration water, reverse osmosis water, distilled water, and the like. Within an extent not interfering with the dispersion of the silver particles, ions or the like may be present in water.

The content of water in the ink composition of the present embodiment is not limited to a range in which the dispersion of the silver particles can be maintained, but is preferably from 50% by mass to 95% by mass based on the total amount of the ink composition. If the content of water in the ink composition is within such a range, the dispersibility of the silver particles and the white pigment becomes better, and the storage stability can be increased.

Furthermore, the content of water being from 50% by mass to 95% by mass indicates that the content of the components other than water is 5% by mass to 50% by mass. In the present specification, the components other than water may be referred to as solid in some cases, and the content of water being from 50% by mass to 95% by mass indicates that the concentration of the solid in the ink composition is 5% by mass to 50% by mass.

1.4. Other Components

The ink composition of the present embodiment may contain surfactants, polyhydric alcohols, pH modifiers, resins, coloring materials, if necessary. As these components, the same components as in Embodiment A can be used.

1.5. Applications and Physical Properties of Ink Composition

Applications of the ink composition of the present embodiment are not particularly limited, and the ink composition may be applied, for example, to a writing tool, a stamp, a recorder, a pen plotter, an ink jet recording apparatus, and the like.

The physical properties of the ink composition used in the present embodiment are the same as in Embodiment A. Further, the recording apparatuses that are preferably used are also the same as in Embodiment A.

Furthermore, since the particle diameter d90 in the particle diameter accumulation curve of the silver particles contained in the ink composition of the present embodiment is 50 nm to 1 μm, the dispersibility of the silver particles is good and the storage stability is excellent. Further, the ink composition of the present embodiment contains the white pigment as described above. Thus, when coated by the ink jet recording method, coloration of the metallic gloss of the coating film can be inhibited. That is, black to brown hues caused by the silver particles being powders can be inhibited by the white pigment, and thus, a metallic gloss having strong whiteness (reduced coloration) can be expressed.

In addition, the degree of gloss of the image formed on the recording medium by the ink composition can be evaluated by the method of Japanese Industrial Standards (JIS) Z8741: 1997 "Method for Measurement of Specular Degree of Gloss", as in Embodiment A.

2. Recording Method

The recording head used in the present embodiment is the same as in Embodiment A.

2.2. Recording Medium

The kind of the recording medium on which the ink composition is adhered by the recording method of the present embodiment is not particularly limited, but examples of the recording medium in the recording method of the present embodiment include absorptive recording media such as paper, porous films, cloth, and the like. In addition, the recording medium may be, for example, a recording medium having a substrate having no ink absorptivity, such as plastic and the like.

The recording medium may be any one of gloss-type, matte-type, and dull-type ones. Specific examples of the recording medium include surface-processed paper such as coated paper, art paper, cast coated paper, and the like, vinyl chloride sheets on which an ink-receiving layer is formed, plastic films such as a PET film and the like, and others.

According to the recording method of the present embodiment, the ink composition described above is used, and thus, an image having good metallic gloss on a recording medium and also, having less coloration (good whiteness) can be recorded. In the recording method of the present embodiment, when the particle diameter d10 in the particle diameter accumulation curve of the silver particles is set to be 2 nm to 20 nm, the silver particles can be dispersed as a dispersion colloid. As a result, the dispersibility of the silver particles can be further improved and also, the degree of metallic gloss of the image can be sufficiently increased. Further, when the particle diameter d50 of the white pigment included in the ink composition in the particle diameter accumulation curve is set to be 100 nm to 2 μm, the content of the white pigment can be reduced and also, an image having a superior balance between whiteness and metallic gloss can be recorded.

EXAMPLE A

EXAMPLES AND COMPARATIVE EXAMPLES

Hereinbelow, with respect to Embodiment A, the invention will be described in detail with reference to Examples and Comparative Examples, but these are not intended to limit the range of the invention.

1. Ink Composition

1.1. Aluminum Pigment Dispersion 1

The aluminum pigment dispersion 1 used in the ink compositions of Examples A1 to 5 and Comparative Examples A1 to 2 was prepared in accordance with "1.1.1. Method for Preparing Aluminum Pigment Dispersion" and "1.1.2. Method for Preparing Water-resistant Aluminum Pigment Dispersion" of Embodiment A above.

A resin-layer coating liquid containing 3.0% by mass of cellulose acetate butyrate (butylation rate from 35 to 39%, manufactured by Kanto Chemical Co., Inc.) and 97% by mass diethylene glycol diethyl ether (manufactured by Nippon Nyukazai Co., Ltd.) was uniformly coated by a bar coating method onto a PET film having a thickness of 100 μm, and then dried at 60° C. for 10 minutes to form a thin resin film on the PET film.

Next, an aluminum deposition layer with an average thickness of 20 nm was formed on the resin layer using a vacuum deposition apparatus ("VE-1010 Type Vacuum Deposition Apparatus" manufactured by Vacuum Device Inc.).

Next, the laminate formed by the method was simultaneously subjected to peeling, pulverization, and dispersion treatments in diethylene glycol diethyl ether using a VS-150 Ultrasonic Disperser (manufactured by As One Corporation), thereby preparing an aluminum pigment dispersion by carrying out an ultrasonic dispersion treatment for 12 cumulative hours.

The obtained aluminum pigment dispersion was subjected to a filtration treatment using an SUS mesh filter with 5-μm openings to remove the coarse and large particles. Next, the filtrate was poured into a round-bottom flask and the diethylene glycol diethyl ether was distilled off using a rotary evaporator. After the aluminum pigment dispersion was concentrated by the above step, the concentration of the aluminum pigment dispersion was adjusted to obtain an aluminum pigment dispersion at a concentration of 5.0% by mass.

Subsequently, after 5.0 g of the obtained aluminum pigment dispersion was placed in a beaker, and 0.57 g of TEOS which was a silica raw material and 0.1 g of aqueous ammonia at a concentration of 1 mol/L which was a basic catalyst were then added in the beaker, a hydrolysis reaction was performed by stirring at room temperature for 7 days. As a result, an aluminum pigment dispersion in which a silica film was formed on the surface of the aluminum pigment was obtained.

Next, the dispersion was subjected to centrifugal separation (10,000 rpm, 60 minutes) to remove the solvent contained in the aluminum pigment dispersion in which the silica film was formed. Subsequently, while stirring, an aqueous solution containing 0.2% by mass of Polystar OM (hereinafter referred to as "0.2% aqueous Polystar OM solution") was added as a surfactant in an amount which was calculated so that the concentration of the aluminum pigment was 1.7% by mass. As a result, a water-resistant aluminum pigment dispersion 1 was obtained.

1.2. Aluminum Pigment Dispersion 2

The aluminum pigment dispersion 2 used in the ink composition of Example A6 was prepared as follows.

A resin-layer coating liquid containing 3.0% by mass of cellulose acetate butyrate (butylation rate from 35 to 39%, manufactured by Kanto Chemical Co., Inc.) and 97% by mass of diethylene glycol diethyl ether (manufactured by Nippon Nyukazai Co., Ltd.) was uniformly coated by a bar coating method onto a PET film having a thickness of 100 μm, and then dried for 10 minutes at 60° C. to form a thin resin film on the PET film.

Next, an aluminum deposition layer with an average thickness of 20 nm was formed on the resin layer using a vacuum deposition apparatus (VE-1010 Type Vacuum Deposition Apparatus manufactured by Vacuum Device Inc.).

Next, the laminate formed by the method was simultaneously subjected to peeling, pulverization, and dispersion treatments in diethylene glycol diethyl ether using a VS-150 Ultrasonic Disperser (manufactured by As One Corporation) to prepare an aluminum pigment dispersion which was formed by ultrasonically dispersing for 12 cumulative hours.

The obtained aluminum pigment dispersion was subjected to a filtration treatment using an SUS mesh filter with 5-μm openings to remove the coarse and large particles. Next, the filtrate was poured into a round-bottom flask and the diethylene glycol diethyl ether was distilled off using a rotary evaporator. After the aluminum pigment dispersion was concentrated by the above step, the concentration of the aluminum pigment dispersion was adjusted to obtain an aluminum pigment dispersion 2 at a concentration of 5.0% by mass.

Subsequently, LMS-2000e, a laser diffraction scattering particle size distribution measurement apparatus manufactured by Seishin Enterprise Co., Ltd., was used to measure a sphere-equivalent 50% average particle diameter (d50) by a light scattering method of the aluminum pigment, which was found to be 1.001 μm.

1.3. Titanium Dioxide Dispersion 1

For a titanium dioxide dispersion 1, the preparation was carried out as follows.

25 parts by mass of a solid acrylic acid/n-butyl acrylate/benzyl methacrylate/styrene copolymer with a glass transition temperature of 40° C., a mass average molecular weight of 10,000 and an acid value of 150 mg KOH/g was dissolved in a mixed solution of 3.2 parts by mass of sodium hydroxide and 71.8 parts by mass of water to obtain a polymer dispersant solution 1 with a resin solid content of 25% by mass.

19 Parts by mass of water was added to 36 parts by mass of the polymer dispersant solution 1 and mixed to prepare a resin varnish for dispersing titanium dioxide, further, 45 parts by mass of titanium dioxide (CR-90, treated with alumina and silica (alumina/silica≥0.5) and an average primary particle diameter of 0.25 μm and an oil absorption amount of 21 ml/100 g, manufactured by Ishihara Sangyo Kaisha Ltd.) was added, followed by stirring and mixing, and then kneading was carried out with a wet circulation mill to obtain the titanium dioxide dispersion 1.

1.4. Titanium Dioxide Dispersion 2

25 parts by mass of a solid acrylic acid/n-butyl acrylate/benzyl methacrylate/styrene copolymer with a glass transition temperature of 40° C., a mass average molecular weight of 10,000 and an acid value of 150 mg KOH/g was dissolved in a mixed solution of 75 parts by mass of diethylene glycol diethyl ether to obtain a polymer dispersant solution 2 with a resin solid content of 25% by mass.

19 parts by mass of diethylene glycol diethyl ether was added to 36 parts by mass of the polymer dispersant solution 2 and mixed to prepare a resin varnish for dispersing titanium dioxide, further, 45 parts by mass of titanium dioxide (CR-90, treated with alumina and silica (alumina/silica≥0.5) and an average primary particle diameter of 0.25 μm and an oil absorption amount of 21 ml/100 g, manufactured by Ishihara Sangyo Kaisha Ltd.) was added, followed by stirring and mixing, and then kneading was carried out with a wet circulation mill to obtain the titanium dioxide dispersion 2.

1.3. Ink Composition

The ink compositions used in Examples A1 to 5 and Comparative Examples A1 to 2 were prepared using titanium dioxide 1 (volume-based average particle diameter 250 nm), titanium dioxide 2 (volume-based average particle diameter 250 nm) and hollow particles (SX8782 (D), manufactured by JSR Corporation, volume-based average particle diameter 1000 nm) as the aluminum pigment dispersion 1 and the white pigment. Specifically, the aqueous aluminum pigment dispersion was prepared, titanium dioxide, glycerin, 1,2-hexanediol, and a surfactant (BYK-348: manufactured by BYK Japan K.K.), and ion exchange water were mixed in the blend as described in Table 1, and mixed/stirred with a magnetic stirrer for 30 minutes at a normal temperature/normal pressure. Here, in Table 1, for the contents of the aluminum pigment, titanium dioxide, and the hollow particles, the amounts of the solid contents excluding water are described. Further, the ratios (%) of the content of the white pigment to the content of the aluminum pigment in the ink compositions of each Example and each Comparative Example are also shown in Tables 1 and 2.

Furthermore, the ink composition used in Example A6 was prepared by preparing the aluminum pigment dispersion 2, mixing diethylene glycol diethyl ether (DEGDE), γ-butyrolactone, tetraethylene glycol dimethyl ether (TEGDM), tetraethylene glycol monobutyl ether (TEGMB), BYK-UV3500 (trade name, manufactured by BYK Japan K.K.), and isopropyl alcohol in the blend as described in Table 1, and mixing/stirring with a magnetic stirrer for 30 minutes at a normal temperature/normal pressure. Here, in Table 1, for the contents of the aluminum pigment, and titanium dioxide, the amounts of the solid contents excluding water are described. Further, the ratios (%) of the content of the white pigment to the content of the aluminum pigment in the ink compositions of each Example and each Comparative Example are also shown in Tables 1 and 2.

TABLE 1

| Component | Example A1 | Example A2 | Example A3 | Example A4 | Example A5 | Example A6 | Comparative Example A1 | Comparative Example A2 |
|---|---|---|---|---|---|---|---|---|
| Aluminum dispersion 1 | 2 | 2 | 2 | 2 | 2 | | 2 | 2 |
| Aluminum dispersion 2 | | | | | | 2 | | |
| Titanium dioxide dispersion 1 | 0.02 | 0.5 | 1 | 20 | | | 0 | 24 |
| Titanium dioxide dispersion 2 | | | | | | 1 | | |
| Hollow resin particle | | | | | 0.5 | | | |
| Glycerin | 10 | 10 | 10 | 10 | 10 | | 10 | 10 |
| 1,2-Hexanediol | 3 | 3 | 3 | 3 | 3 | | 3 | 3 |
| BYK-348 | 1 | 1 | 1 | 1 | 1 | | 1 | 1 |
| Diethylene glycol diethyl ether | | | | | | 40 | | |
| γ-Butyrolactone | | | | | | 10 | | |
| Tetraethylene glycol dimethyl ether | | | | | | 10 | | |
| Tetraethylene glycol monobutyl ether | | | | | | 3 | | |

TABLE 1-continued

| Component | Example A1 | Example A2 | Example A3 | Example A4 | Example A5 | Example A6 | Comparative Example A1 | Comparative Example A2 |
|---|---|---|---|---|---|---|---|---|
| BYK-UV3500 | | | | | | 0.2 | | |
| Isopropylalcohol | | | | | | Balance | | |
| Ion exchange water | Balance | Balance | Balance | Balance | Balance | | Balance | Balance |
| Total | 100 | 100 | 100 | 100 | 100 | 100 | 100 | 100 |

TABLE 2

| Components | Example A7 | Example A8 | Example A9 | Example A10 | Comparative Example A3 | Comparative Exam ple A4 |
|---|---|---|---|---|---|---|
| Aluminum Dispersion 1 | 3 | 3 | 3 | 3 | 3 | 3 |
| Titanium Dispersion 1 | 0.03 | 0.75 | 1.5 | 30 | 0 | 36 |
| Glycerin | 10 | 10 | 10 | 10 | 10 | 10 |
| 1,2-Hexanediol | 3 | 3 | 3 | 3 | 3 | 3 |
| BYK-348 | 1 | 1 | 1 | 1 | 1 | 1 |
| Ion exchange water | Balance | Balance | Balance | Balance | Balance | Balance |
| Total | 100 | 100 | 100 | 100 | 100 | 100 |

2. Preparation of Evaluation Sample

The recorded matter of each of the Examples and each of the Comparative Examples was prepared using an ink jet printer type PX-G930 (manufactured by Seiko Epson Corporation) as the ink jet recording apparatus. The ink compositions of each Example and each Comparative Example were prepared by filling the ink composition into a black ink chamber of a cartridge exclusively for the printer, fitting it in the printer, and printing. For the recording medium, photo paper <Glossy> (Seiko Epson Corporation) was used.

In all of the samples, the printing was carried out under the printing conditions in which the photo paper gloss was selected as the paper, color correction was conducted, and Photo-1440 dpi and unidirectional printing were set. For the image, the duty varied by 20% from 20% to 100%, and each duty was evaluated in each Example and each Comparative Example.

3. Evaluation Method

For the samples of each Example and each Comparative Example, the degree of gloss and the whiteness were evaluated. The degree of gloss was measured using a MULTI GLOSS 268 glossmeter manufactured by Konica Minolta Co., Ltd., and at the incidence angles of 20° and 60°. The measurement results at the duties of 20%, 40%, 60%, 80%, and 100% and the incidence angles of 20° and 60° are shown in Table 1.

The whiteness was measured using a "938 Spectrodensitometer" (manufactured by X-Rite Inc.). D50 was taken as a light source and the lightness of (L*) at each duty of 20%, 40%, 60%, 80%, and 100% was taken as a whiteness index. The evaluation criteria for the whiteness were as follows: at a duty of 100%, L* of 57 or more was denoted as A, L* from 50 to less than 57 was denoted as B, and L* of less than 50 was denoted as C in Table 3.

Furthermore, in order to assess the balance between the whiteness and the degree of gloss, for each duty, the values of products of the rate of increase of the L* values and the rate of decrease of the degrees of gloss at 60° "(rate of increase of L* value)×(rate of decrease of gloss at 60°)" were determined. As a standard for the rate of increase of the L* values and the rate of decrease of the degrees of gloss at 60°, Comparative Example A1 in which titanium dioxide particles were not included was used. That is, "(rate of increase of L* value)×(rate of decrease of gloss at 60°)" indicates the degree of improvement of the balance between the whiteness and the degree of gloss on the basis of Comparative Example A1.

The evaluation criteria for the "(rate of increase of L* value)×(rate of decrease of gloss at 60°)" were as follows: a maximum value in each duty of 1.1 or more was taken as A, a maximum value in each duty from 1.05 to less than 1.1 was taken as B, a maximum value in each duty from 1 to less than 1.05 was taken as C, and a maximum value in each duty of less than 1.0 was taken as D.

Sensory evaluation on the gloss was carried out. The glossy feelings of the evaluation samples on which the solid printing at a duty of 100% had been carried out were scored as 0, 1, 2, and 3 by 10 people, from which an average score was calculated. An average score from 2.0 to 3.0 was taken as A, an average score from 1.0 to less than 2.0 was taken as B, and an average score of less than 1.0 was taken as C.

Furthermore, as the comprehensive evaluation on the whiteness and the glossy feeling, the results of evaluation of the "(rate of increase of L* value)×(rate of decrease of gloss at 60°)" and the results of the sensory evaluation of the gloss were integrated and evaluated. By comparing two evaluations, a low rating evaluation was taken as a comprehensive evaluation on the glossy feeling.

4. Evaluation Results

TABLE 3

| | Example A1 | Example A2 | Example A3 | Example A4 | Example A5 | Example A6 | Comparative Example A1 | Comparative Example A2 |
|---|---|---|---|---|---|---|---|---|
| L* value at a Duty of 20% | 67.45 | 73.12 | 76.21 | 77.46 | 75.33 | 77.65 | 66.36 | 80.46 |
| L* value at a Duty of 40% | 58.21 | 63.32 | 66.33 | 66.56 | 65.23 | 69.35 | 56.76 | 69.48 |
| L* value at a Duty of 60% | 55.87 | 58.34 | 60.46 | 63.87 | 61.34 | 63.47 | 53.87 | 66.87 |
| L* value at a Duty of 80% | 54.02 | 57.02 | 58.63 | 60.18 | 60.12 | 61.71 | 50.18 | 63.18 |
| L* value at a Duty of 100% | 52.33 | 55.33 | 57.22 | 60.13 | 60.36 | 59.53 | 49.12 | 62.35 |
| 60° Degree of Gloss at a Duty of 20% | 117 | 112 | 110 | 104 | 110 | 190 | 118 | 95 |
| 60° Degree of Gloss at a Duty of 40% | 118 | 116 | 114 | 105 | 112 | 192 | 120 | 96 |

TABLE 3-continued

|  | Example A1 | Example A2 | Example A3 | Example A4 | Example A5 | Example A6 | Comparative Example A1 | Comparative Example A2 |
|---|---|---|---|---|---|---|---|---|
| 60° Degree of Gloss at a Duty of 60% | 120 | 119 | 118 | 106 | 117 | 195 | 121 | 96 |
| 60° Degree of Gloss at a Duty of 80% | 122 | 122 | 120 | 109 | 119 | 201 | 124 | 98 |
| 60° Degree of Gloss at a Duty of 100% | 122 | 123 | 121 | 110 | 120 | 203 | 124 | 98 |
| (increase rate of L* value) * (decrease rate of gloss at 60°) Duty 20% | 1.0078 | 1.0458 | 1.0706 | 1.0288 | 1.0582 | 1.8841 | 1.0000 | 0.9761 |
| (increase rate of L* value) * (decrease rate of gloss at 60°) Duty 40% | 1.0085 | 1.0784 | 1.1102 | 1.0261 | 1.0726 | 1.9549 | 1.0000 | 0.9793 |
| (increase rate of L* value) * (decrease rate of gloss at 60°) Duty 60% | 1.0286 | 1.0651 | 1.0945 | 1.0387 | 1.1010 | 1.8988 | 1.0000 | 0.9849 |
| (increase rate of L* value) * (decrease rate of gloss at 60°) Duty 80% | 1.0592 | 1.1180 | 1.1307 | 1.0542 | 1.1498 | 1.9934 | 1.0000 | 0.9951 |
| (increase rate of L* value) * (decrease rate of gloss at 60°) Duty 100% | 1.0482 | 1.1173 | 1.1367 | 1.0859 | 1.1892 | 1.9840 | 1.0000 | 1.0032 |
| Determination of change rate of gloss | B | A | A | B | A | A | C | D |
| Gloss sensory evaluation | A | A | B | B | A | A | A | C |
| Comprehensive evaluation | B | A | B | B | A | A | C | D |

TABLE 4

|  | Example A7 | Example A8 | Example A9 | Example A10 | Comparative Example A3 | Comparative Example A4 |
|---|---|---|---|---|---|---|
| L* value at a Duty of 40% | 57.56 | 62.22 | 64.30 | 65.44 | 55.71 | 68.48 |
| L* value at a Duty of 60% | 54.76 | 57.32 | 60.51 | 62.35 | 52.46 | 65.77 |
| L* value at a Duty of 80% | 52.39 | 55.20 | 57.46 | 59.78 | 49.12 | 62.01 |
| 60° Degree of Gloss at a Duty of 40% | 119 | 118 | 116 | 106 | 121 | 98 |
| 60° Degree of Gloss at a Duty of 60% | 121 | 120 | 119 | 108 | 125 | 97 |
| 60° Degree of Gloss at a Duty of 80% | 124 | 123 | 122 | 112 | 126 | 99 |
| (increase rate of L* value) * (decrease rate of gloss at 60°) Duty 40% | 1.0161 | 1.0892 | 1.1065 | 1.0290 | 1.0000 | 0.9956 |
| (increase rate of L* value) * (decrease rate of gloss at 60°) Duty 60% | 1.0104 | 1.0489 | 1.0981 | 1.0269 | 1.0000 | 0.9729 |
| (increase rate of L* value) * (decrease rate of gloss at 60°) Duty 80% | 1.0496 | 1.0970 | 1.1327 | 1.0818 | 1.0000 | 0.9919 |
| Determination of change rate of gloss | B | A | A | B | C | D |
| Gloss sensory evaluation | A | A | B | B | A | C |
| Comprehensive evaluation | B | A | B | B | C | D |

As seen from Table 3, the sample of each Example in which the ink composition having a content of titanium dioxide from 0.01 times to 10 times the content of the aluminum pigment was used was excellent in both of the whiteness and the degree of gloss. On the other hand, the sample of Comparative Example A1 in which the white pigment was not contained had insufficient whiteness. Further, the sample of Comparative Example 2 in which the ink composition having a content of titanium dioxide of 15 times the content of the aluminum pigment was used had good whiteness, but had an insufficient degree of gloss and a low balance between the whiteness and the degree of gloss.

From these results, it was proved that by the ink composition in which the content of titanium dioxide is 0.01 times to 10 times the content of the aluminum pigment, both of the glossiness and the whiteness could be satisfied. That is, it was proved that by using the ink composition in which the content of titanium dioxide is 0.01 times to 10 times the content of the aluminum pigment, an image having metallic gloss with less coloration (good whiteness) can be formed.

On the other hand, the dependence of the L* values on the duty in each Example and each Comparative Example was investigated. FIG. 1 is a graph in which the L* values are plotted with respect to the duties in the samples of each Example and each Comparative Example. As seen from FIG. 1, it was proved that the ink compositions of Examples A3 to 5 had improved whiteness, as compared with that of Comparative Example A1 in a wide range of duties. Also, it was determined that the ink composition of Comparative Example A1 had insufficient whiteness at each duty, and thus there occurred coloration.

Figure 2:
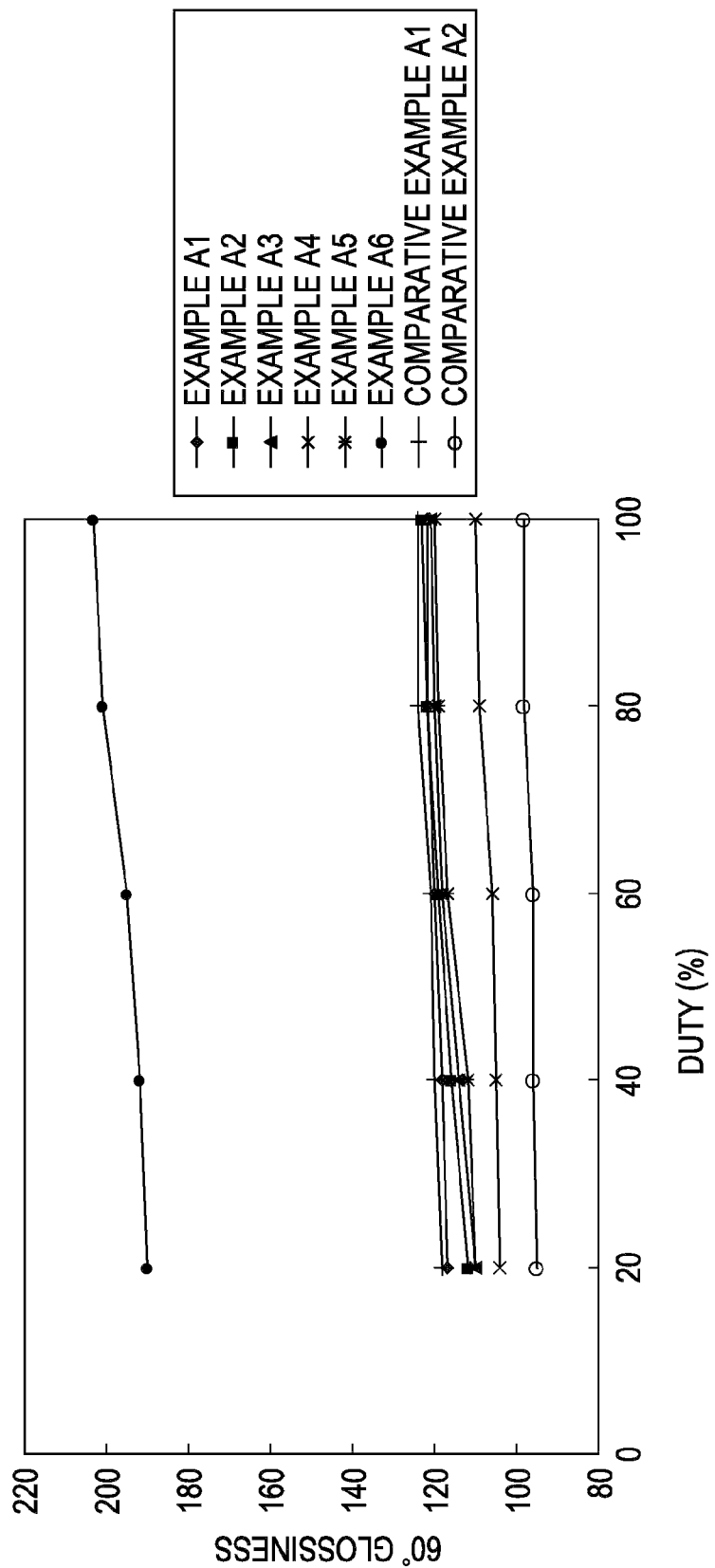
FIG. 2 shows a plot showing dependence of the degree of gloss at 60° on the duty of recorded matters of Examples and Comparative Examples.

Furthermore, the dependence of the degree of gloss at 60° on the duty in each Example and each Comparative Example was investigated. FIG. 2 is a graph in which the degrees of gloss at 60° are plotted with respect to the duties in the samples of each Example and each Comparative Example. As seen from FIG. 2, it was proved that the ink compositions of Example A1 and Example A2 apparently expressed the degree of gloss which is one of the effects of the aluminum pigment at a duty of about 20%. It was proved that the ink composition of Example A1 had a good degree of gloss at 60°, which was similar to that of Comparative Example A1. Also, it was proved that the degree of gloss of Comparative Example A2 was apparently reduced, as compared with that of Comparative Example A1.

It can be seen that the whiteness and the degree of gloss of the ink composition of Example A1 are relatively similar to those of the ink composition of Comparative Example A1 in a range of high duties. On the other hand, as seen from Table 1, it can be seen that the sample of Example A1 had particularly good values of (rate of increase of L* value)×(rate of decrease of gloss at 60°) at the duties of 20% and 40%. That is, it was proved that by setting the content of titanium dioxide to be about 0.25 times the content of the aluminum pigment, an apparent effect in the balance between the whiteness and the degree of gloss at low duties was obtained. It was proved that when forming an image at low duties, the ink composition of Example A2 is practically useful, and thus, it has an excellent effect.

Furthermore, as seen from Tables 2 and 4, good results can also be obtained in Examples A7 to A10, in which the amounts of addition of the aluminum pigment were changed.

EXAMPLE B

EXAMPLES AND COMPARATIVE EXAMPLES

Hereinbelow with respect to Embodiment B, the invention will be described in detail with reference to Examples and Comparative Examples, but these are not intended to limit the range of the invention.

1. Ink Composition
1.1. Aqueous Silver Particle Dispersion

The aqueous silver particle dispersions used in the ink compositions of Examples and Comparative Examples were prepared in accordance with "1.1.2.1. First Approach" of Embodiment B above as follows. First, polyvinylpyrrolidone was dissolved in propylene glycol to obtain a first solution. Then, silver nitrate which is a silver precursor was dissolved in propylene glycol to obtain a second solution. Next, the first solution and the second solution were mixed at 120° C. for 90 minutes to reduce the silver precursor, and polyvinylpyrrolidone was adsorbed on the surface of the resulting silver particles. Then, the formed silver particles (silver colloidal particles) were separated by centrifugal separation and the separated silver particles were dispersed in water to a solid content concentration of 20% by mass. As above, an aqueous silver particle dispersion was prepared.

The particle diameter d10, the particle diameter d50, and the particle diameter d90 of silver particles were determined by a dynamic light scattering method using a particle diameter measurement apparatus, Model Nanotrac UPA-EX-150 manufactured by Nikkiso Co., Ltd. As a result, for the silver particles in the aqueous silver particle dispersion, the particle diameter d10 was found to be 10 nm (in the range of 2 nm to 20 nm), the particle diameter d50 was found to be 20 nm, and the particle diameter d90 was found to be 80 nm (in the range of 50 nm to 1 μm).

1.2. White Pigment

As the white pigments of each Example and each Comparative Example, NanoTek (registered trademark) Slurry (an aqueous dispersion of titanium dioxide particles having a primary average particle diameter of 100 nm (solid content concentration: 10% by mass)), available from C. I. Kasei Co., Ltd., was used. Further, for the NanoTek (registered trademark) Slurry, the particle diameter d50 was checked by a dynamic light scattering method, and thus, a value of 100 nm was obtained.

1.3. Ink Composition

The ink compositions used in each Example and each Comparative Example were prepared using the aqueous silver particle dispersions and the white pigment slurries above. Specifically, the aqueous silver particle dispersion was prepared, a white pigment slurry, glycerin, 1,2-hexanediol, and a surfactant (BYK-348: manufactured by BYK Japan K.K.), and ion exchange water were mixed in the blend as described in Table 5, and sufficiently stirred. Here, in Table 5, for the contents of the silver particles and titanium dioxide, the amounts of the solid contents excluding water are described. Further, the ratios (%) of the content of the white pigment to the content of the silver particle in the ink compositions of each Example and each Comparative Example are also shown in Table 5.

Furthermore, the particle diameter accumulation curve of the silver particles in the ink compositions of each Example and each Comparative Example were measured using electron microscopy. At this time, an EDX method was also used to distinguish the silver particles from the white pigment. The apparatus used in the electron microscopy and the EDX method was a scanning electron microscope (S-4700: manufactured by Hitachi, Ltd.) equipped with an EDX analyzer (EMAX-W: manufactured by Horiba, Ltd.). The particle diameter accumulation curve was determined by randomly selecting 200 silver particles from each ink composition, and subjecting them to an image treatment. As a result, the particle diameter d10 was about 10 nm and the particle diameter d90 was about 80 nm, which coincide with particle diameter d10 and the particle diameter d90, determined by a dynamic light scattering method for the aqueous silver particle dispersion.

Furthermore, the particle diameter accumulation curve of the silver particles and the white pigment in the ink compositions of each Example and each Comparative Example were also confirmed by a centrifugation method. Specifically, a centrifugal tube having a length of 10 cm was filled with each ink composition, centrifugation was carried out at 1000 rpm for 5 hours, and then a range at 1 cm from the top of the tube and a range at 1 cm from the bottom of the tube were collected. Further, the collected dispersed matters were measured by a dynamic light scattering method, and the particle diameter accumulation curve of the silver particles and the white pigment were each determined. As a result, the obtained values were found to be as follows: for the silver particles, the particle diameter d10 was about 10 nm and the particle diameter d90 was about 80 nm, and for the white pigment, the particle diameter d50 was 100 nm.

TABLE 5

|  |  | Example B1 | Example B2 | Example B3 | Comparative Example B1 | Comparative Example B2 |
| --- | --- | --- | --- | --- | --- | --- |
| Component (% by mass) | Silver particles | 10 | 10 | 10 | 10 | 10 |
|  | Titanium dioxide | 0.1 | 0.5 | 1 | 0 | 3.5 |
|  | Glycerin | 10 | 10 | 10 | 10 | 10 |

TABLE 5-continued

|  |  | Example B1 | Example B2 | Example B3 | Comparative Example B1 | Comparative Example B2 |
|---|---|---|---|---|---|---|
|  | 1,2-Hexanediol | 3 | 3 | 3 | 3 | 3 |
|  | BYK-348 | 0.5 | 0.5 | 0.5 | 0.5 | 0.5 |
|  | Ion exchange water | Balance | Balance | Balance | Balance | Balance |
|  | Total | 100 | 100 | 100 | 100 | 100 |
|  | Ratio of white pigments to silver particles (%) | 1 | 5 | 10 | 0 | 35 |
| Evaluation Results | Duty (%) |  |  |  |  |  |
|  | 20  L* value | 25.43 | 26.81 | 30.23 | 21.35 | 35.32 |
|  | 40 | 17.63 | 24.82 | 30.02 | 16.57 | 36.33 |
|  | 60 | 15.86 | 27.16 | 32.72 | 13.05 | 38.56 |
|  | 80 | 14.95 | 27.98 | 33.34 | 12.80 | 39.44 |
|  | 100 | 15 | 28 | 33 | 13 | 39.87 |
|  | Determination of whiteness | C | B | A | D | A |
|  | 20  Degree of gloss at 60° | 461 | 319 | 235 | 493 | 133 |
|  | 40 | 555 | 368 | 266 | 564 | 162 |
|  | 60 | 561 | 356 | 262 | 567 | 166 |
|  | 80 | 566 | 360 | 257 | 566 | 171 |
|  | 100 | 572 | 366 | 260 | 563 | 174 |
|  | Determination of gloss at 60° | A | B | C | A | D |
|  | 20  Degree of gloss at 20° | 787 | 461 | 284 | 882 | 253 |
|  | 40 | 967 | 540 | 309 | 1032 | 278 |
|  | 60 | 1007 | 501 | 288 | 1024 | 242 |
|  | 80 | 999 | 506 | 268 | 1003 | 213 |
|  | 100 | 989 | 512 | 266 | 978 | 208 |
|  | 20° gloss determination | A | B | C | A | C |
|  | 20  (increase rate of L* value) × (decrease rate of gloss at 60°) | 1.114 | 0.813 | 0.675 | 1 | 0.446 |
|  | 40 | 1.047 | 0.977 | 0.854 | 1 | 0.630 |
|  | 60 | 1.202 | 1.307 | 1.159 | 1 | 0.865 |
|  | 80 | 1.168 | 1.390 | 1.183 | 1 | 0.931 |
|  | 100 | 1.172 | 1.400 | 1.172 | 1 | 0.948 |
|  | Determination | B | A | B | C | D |

2. Preparation of Evaluation Sample

The recorded matters of each Example and each Comparative Example were prepared using an ink jet printer type PX-G930 (manufactured by Seiko Epson Corporation) as the ink jet recording apparatus. The ink compositions of each Example and each Comparative Example were prepared by filling them into a black ink chamber of a cartridge exclusively for the printer, fitting it in the printer, and printing. For the recording medium, photo paper <glossy> (available from Seiko Epson Corporation) was used.

In any of the samples, the printing was carried out under the printing conditions such that the photo paper gloss was selected as the paper, color correction was conducted, and Photo-1440 dpi and unidirectional printing were set. For the image, the duty varied by 20% from 20% to 100%, and each duty was evaluated in each Example and each Comparative Example.

3. Evaluation Method

The obtained samples of each Example and each Comparative Example were evaluated on the degree of gloss and the whiteness.

For the degree of gloss, a MULTI GLOSS 268 Type glossmeter manufactured by Konica Minolta Co., Ltd. was used and the degrees of gloss at incidence angles of 20° and 60° were measured. The measurement results at the duties of 20%, 40%, 60%, 80%, and 100% and incidence angles of 20° and 60° are shown in Table 5. For evaluation of the glossiness, at a duty of 100% and an incidence angle of 60°, a degree of gloss of 500 or more was denoted as A, a degree of gloss from 300 to less than 500 was denoted as B, a degree of gloss from 200 to less than 300 was denoted as C, and a degree of gloss of less than 200 was denoted as D in Table 5. Further, at a duty 100% and an incidence angle of 20°, a degree of gloss of 700 or more was denoted as A, a degree of gloss from 400 to less than 700 was denoted as B, a degree of gloss from 200 to less than 400 was denoted as C, and a degree of gloss of less than 200 was denoted as D in Table 5.

The whiteness was measured using a "938 Spectrodensitometer" (manufactured by X-Rite Inc.). D50 was taken as a light source and the lightness of (L*) at each duty of 20%, 40%, 60%, 80%, and 100% was taken as a whiteness index. The evaluation criteria for the whiteness were as follows: at a duty of 100%, L* of 30 or more was denoted as A, L* from 20 to less than 30 was denoted as B, and L* from less than 15 to less than 20 was denoted as C, and L* of less than 15 was denoted as D in Table 5.

Furthermore, in order to assess the balance between the whiteness and the degree of gloss, for each duty, products of the rate of increase of the L* values and the rate of decrease of the degrees of gloss at 60° "(rate of increase of L* value)× (rate of decrease of gloss at 60°)" were determined. As a standard for the rate of increase of the L* values and the rate of decrease of the degrees of gloss at 60°, Comparative Example B1 in which titanium dioxide particles were not included was used. That is, "(rate of increase of L* value)× (rate of decrease of gloss at 60°)" indicated the degree of improvement of the balance between the whiteness and the degree of gloss on the basis of Comparative Example B1.

The evaluation criteria for the "(rate of increase of L* value)×(rate of decrease of gloss at 60°)" were as follows: a maximum value in each duty of 1.3 or more was taken as A, a maximum value in each duty from 1.1 to less than 1.3 was taken as B, a maximum value in each duty from 1 to less than 1.1 was taken as C, and a maximum value in each duty of less than 1.0 was taken as D.

4. Evaluation Results

As seen from Table 5, the sample of each Example in which the ink composition having a content of titanium dioxide from 1% to 10% of the content of the silver particles was used was excellent in both of the whiteness and the degree of gloss. On the other hand, the sample of Comparative Example B1 in which the white pigment was not contained had insufficient whiteness. Further, the sample of Comparative Example B2 in which the ink composition having a content of titanium dioxide of 35% of the content of the silver particles was used had good whiteness, but had an insufficient degree of gloss and a low balance between the whiteness and the degree of gloss.

From these results, it was proved that by the ink composition in which the content of titanium dioxide is 1% to 10% of the content of the silver particles, both of the glossiness and the whiteness can be satisfied. That is, it was proved that by the ink composition in which the content of titanium dioxide is 1% to 10% of the content of the silver particles, an image having metallic gloss with less coloration (good whiteness) can be formed.

Figure 3:
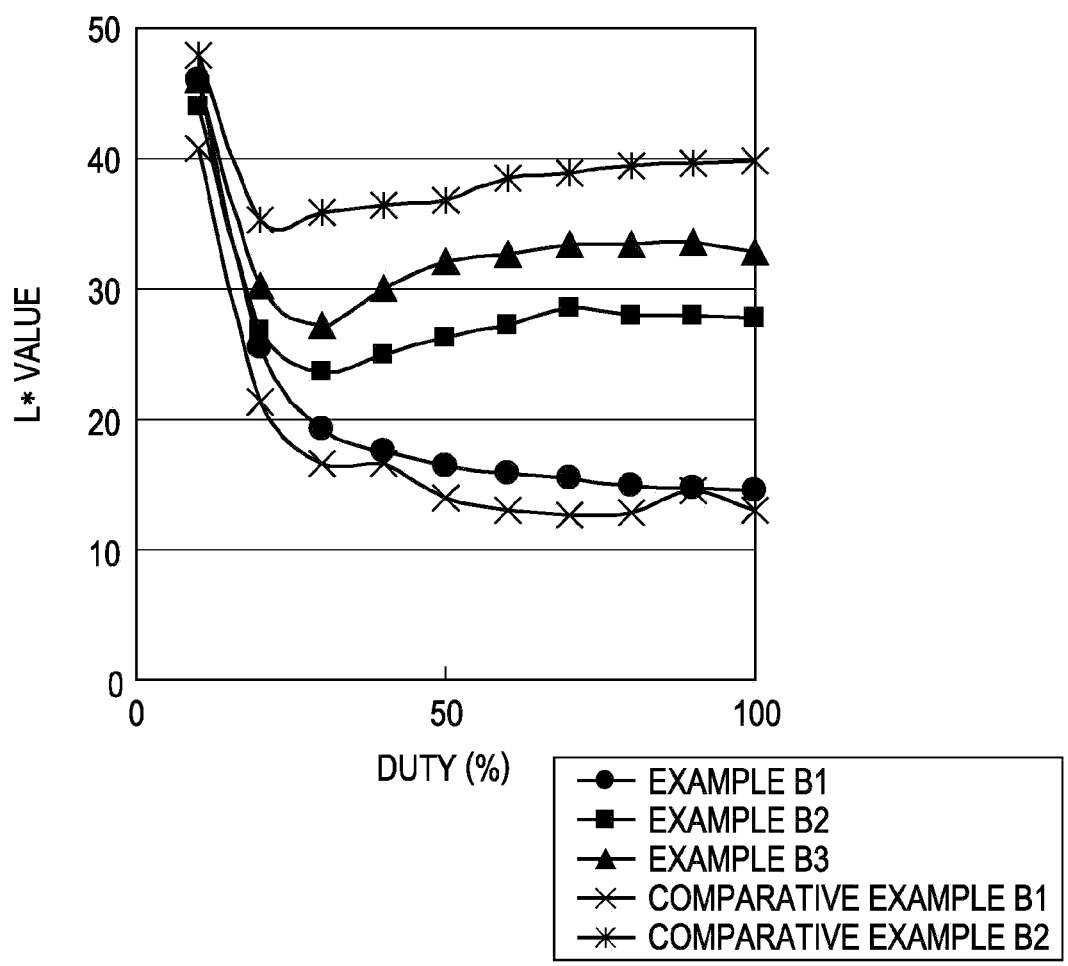
FIG. 3 shows a plot showing dependence of the whiteness on the duty of recorded matters of Examples and Comparative Examples.

On the other hand, the dependence of the L* values on the duty in the samples of each Example and each Comparative Example was investigated. FIG. 3 is a graph in which the L* values are plotted with respect to the duties in each Example and each Comparative Example. As seen from FIG. 3, it was proved that the ink compositions of Example B2 and Example B3 apparently expressed improvement of the whiteness (reduced coloration) which is one of the effects of titanium dioxide at a duty of about 20%. Also, it was proved that the whiteness of the ink composition of Example B1 was improved at a wide range of duties, as compared with that of Comparative Example B1.

Figure 4:
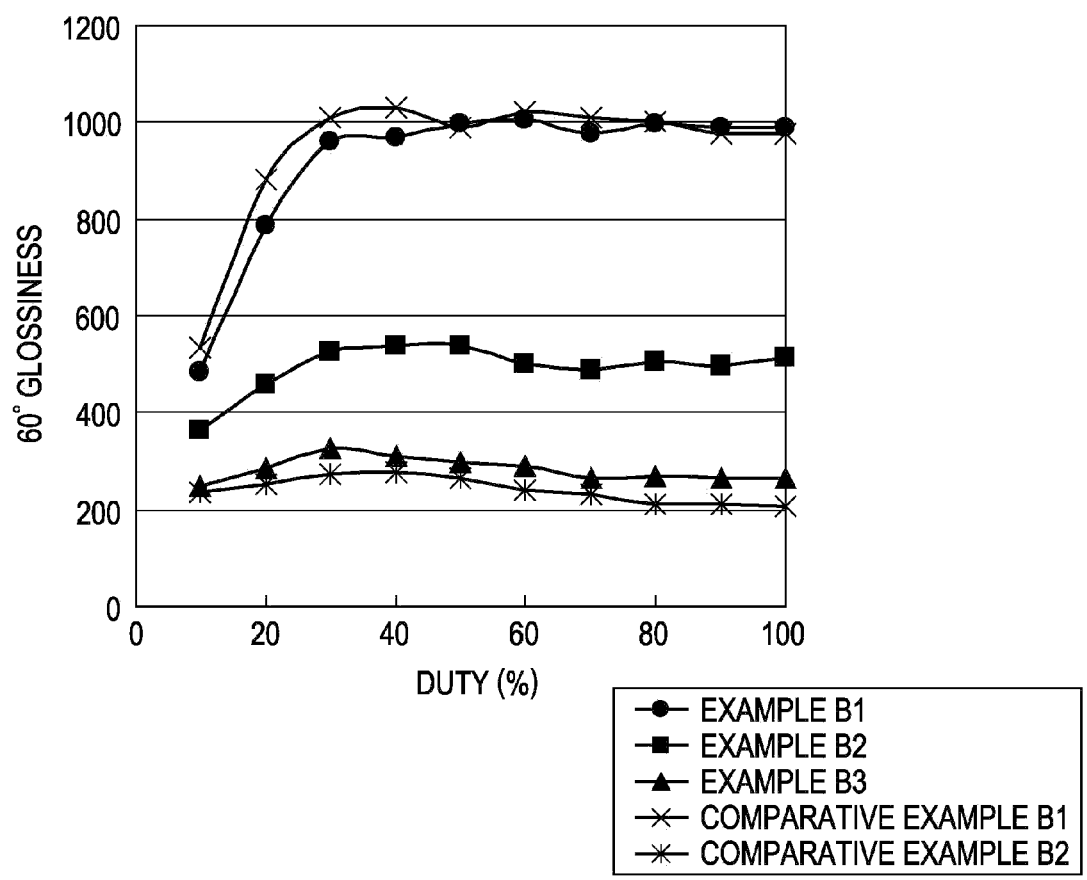
FIG. 4 shows a plot showing dependence of the degree of gloss at 60° on the duty of recorded matters of Examples and Comparative Examples.

Furthermore, the dependence of the degree of gloss at 60° on the duty in each Example and each Comparative Example was investigated. FIG. 4 is a graph in which the degrees of gloss at 60° are plotted with respect to the duties in each Example and each Comparative Example. As seen from FIG. 4, it was proved that the ink compositions of Example B2 and Example B3 apparently expressed the degree of gloss which is one of the effects of the silver particles at a duty of about 20%. It was proved that the ink composition of Example B1 had a good degree of gloss at 60°, which was similar to that of Comparative Example B1.

Figure 5:
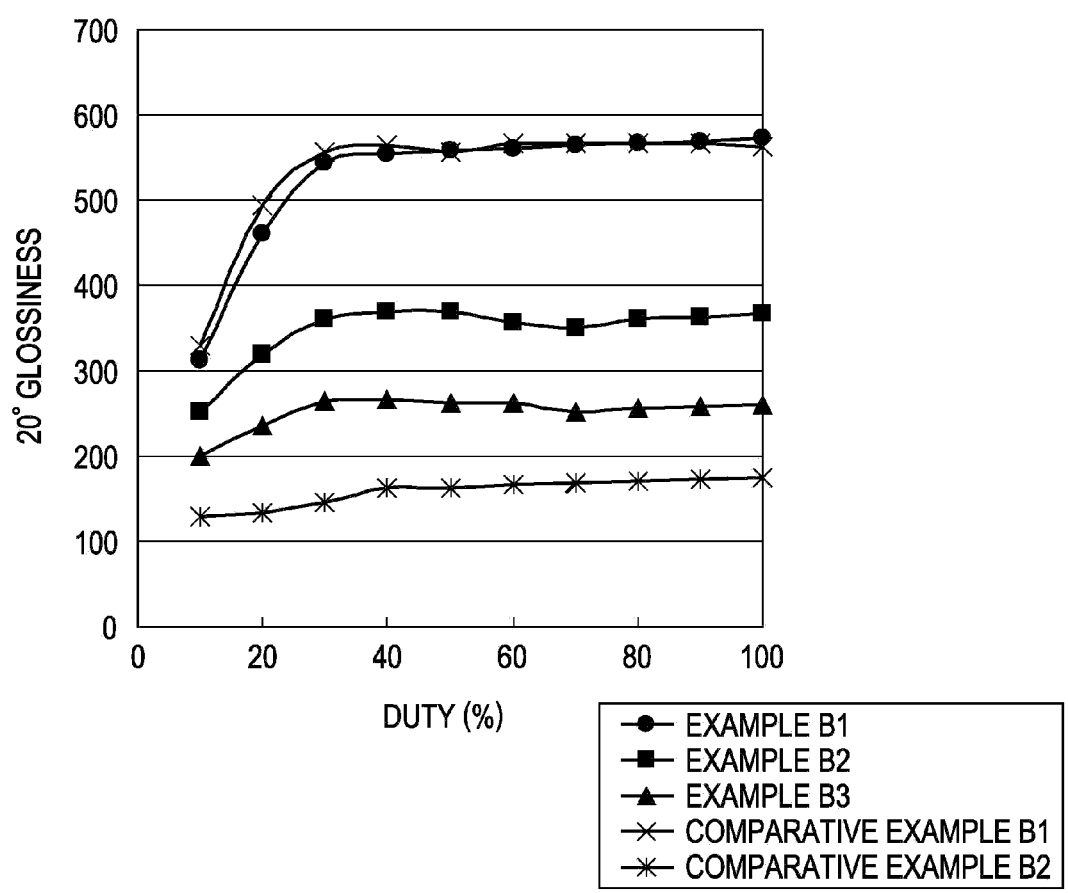
FIG. 5 shows a plot showing dependence of the degree of gloss at 20° on the duty of recorded matters of Examples and Comparative Examples.

Similarly, the dependence of the degree of gloss at 20° on the duty in each Example and each Comparative Example was investigated. FIG. 5 is a graph in which the degrees of gloss at 20° are plotted with respect to the duties in the samples of each Example and each Comparative Example. As seen from FIG. 5, it was proved that the ink compositions of Example B2 and Example B3 apparently expressed the degree of gloss which is one of the effects of the silver particles at a duty of about 20%. Further, it was proved that the ink composition of Example B1 had a good degree of gloss at 20°, which was similar to that of Comparative Example B1.

Furthermore, (rate of increase of L* value)×(rate of decrease of gloss at 60°) shown in Table 5 is based on Comparative Example B1, and thus, Comparative Example B1 and Comparative Example B2 are both examples showing an insufficient balance between the whiteness and the degree of gloss. It can be seen that the whiteness and the degree of gloss of the ink composition of Example B1 are relatively similar to those of the ink composition of Comparative Example B1 in a range of high duties. On the other hand, as seen from Table 5, it can be seen that the sample of Example B1 had particularly good values of (rate of increase of L* value)×(rate of decrease of gloss at 60°) at the duties of 20% and 40%. That is, it was proved that by setting the content of titanium dioxide to be about 1% of the content of the silver particles, an apparent effect in the balance between the whiteness and the degree of gloss at low duties is obtained. It was proved that when forming an image at low duties, the ink composition of Example B1 is practically useful, and thus, it has an excellent effect.

The invention is not limited to the above-referenced embodiments, and various modifications are applicable. For example, the invention includes substantially the same configurations as those described in the embodiment (for example, configurations having the same functions, methods, and results, or configurations having the same purposes and effects). Furthermore, the invention includes configurations in which portions not being essential for the configurations described in the embodiment are substituted. Furthermore, the invention includes configurations that can achieve the same effects or purposes as those of the configurations described in the embodiment. In addition, the invention includes configurations in which publicly known technology is added to the configurations described in the embodiment.

What is claimed is:

1. An ink composition, comprising;
   an aluminum pigment, and
   a white pigment,
   wherein the content of the white pigment is 0.01 times to 10 times the content of the aluminum pigment, and
   wherein the aluminum pigment is a 50% average particle diameter of a circle-equivalent diameter of 0.5 µm to 3 µm, and the average particle diameter of the white pigment is 200 nm to 400 nm.

2. The ink composition according to claim 1,
   wherein the content of the white pigment is 0.25 times to 0.05 times the content of the aluminum pigment.

3. The ink composition according to claim 1,
   wherein the aluminum pigment is a plate-shaped particle having a thickness of 5 nm to 30 nm.

4. The ink composition according to claim 1,
   wherein the content of the aluminum pigment is 1% by mass to 10% by mass.

5. The ink composition according to claim 1,
   further comprising water, wherein the content of the water is 50% by mass to 95% by mass.

6. The ink composition according to claim 1,
   wherein the aluminum pigment is a water-resistant aluminum pigment that has been subjected to a surface treatment with tetraethoxysilane.

7. The ink composition according to claim 1,
   wherein a value calculated by $(\alpha 2/\alpha 1)\times(\beta 2/\beta 1)$ is more than 1, wherein $\alpha 1$ and $\beta 1$ represent L* values and degrees of gloss, respectively, of an image printed at a duty of 60% with a composition obtained by removing the white pigment from the ink composition, and $\alpha 2$ and $\beta 2$ represent L* values and degrees of gloss, respectively, of an image printed at a duty of 60% with the ink composition.

8. A printing apparatus provided with the ink composition of claim 1,
   wherein the ink composition is ejectable onto a printing medium.

9. An ink composition, comprising;
silver particles, a white pigment, and water,
wherein the particle diameter d90 in the particle diameter accumulation curve of the silver particles is 50 nm to 1 μm,
wherein the silver particles are dispersed in the water as a dispersion colloid,
wherein the content of the white pigment is 1% to 10% based on the content of the silver particles, and
wherein the particle diameter d10 in the particle diameter accumulation curve of the silver particles is 2 nm to 20 nm.

10. The ink composition according to claim 9,
wherein the particle diameter d50 in the particle diameter accumulation curve of the white pigment is 100 nm to 2 μm.

11. The ink composition according to claim 9,
wherein the content of the water is 50% by mass to 95% by mass.

12. A recording method comprising adhering the ink composition according to claim 9 on a recording medium to record an image.

13. The recording method according to claim 12,
wherein the particle diameter d50 in the particle diameter accumulation curve of the white pigment is 100 nm to 2 μm.

* * * * *